US010521647B2

(12) United States Patent
Shen et al.

(10) Patent No.: US 10,521,647 B2
(45) Date of Patent: Dec. 31, 2019

(54) BODY INFORMATION ANALYSIS APPARATUS CAPABLE OF INDICATING SHADING-AREAS

(71) Applicant: CAL-COMP BIG DATA, INC., New Taipei (TW)

(72) Inventors: Shyh-Yong Shen, New Taipei (TW); Min-Chang Chi, New Taipei (TW); Hui-Teng Lin, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 180 days.

(21) Appl. No.: 15/828,371

(22) Filed: Nov. 30, 2017

(65) Prior Publication Data

US 2019/0034699 A1 Jan. 31, 2019

(30) Foreign Application Priority Data

Jul. 25, 2017 (CN) .......................... 2017 1 0612666

(51) Int. Cl.
*G06K 9/00* (2006.01)
*G06T 15/80* (2011.01)

(52) U.S. Cl.
CPC ..... *G06K 9/00248* (2013.01); *G06K 9/00241* (2013.01); *G06K 9/00288* (2013.01); *G06T 15/80* (2013.01); *G06K 9/00281* (2013.01)

(58) Field of Classification Search
CPC ........... G06K 9/00248; G06K 9/00241; G06K 9/00288; G06K 9/00281; G06T 15/80
See application file for complete search history.

(56) References Cited

U.S. PATENT DOCUMENTS

| | | | | |
|---|---|---|---|---|
| 5,576,778 A | * | 11/1996 | Fujie | G02C 13/003 33/200 |
| 2015/0243015 A1 | * | 8/2015 | Guerin | G02C 13/003 382/141 |
| 2018/0332950 A1 | * | 11/2018 | Shen | G06K 9/00228 |
| 2019/0035126 A1 | * | 1/2019 | Shen | G06K 9/00281 |
| 2019/0050678 A1 | * | 2/2019 | Shen | G06K 9/00228 |
| 2019/0065827 A1 | * | 2/2019 | Shen | G06T 11/60 |
| 2019/0095696 A1 | * | 3/2019 | Shen | G06K 9/00248 |
| 2019/0095697 A1 | * | 3/2019 | Shen | A45D 44/005 |

FOREIGN PATENT DOCUMENTS

WO 2015172229 A1 11/2015

OTHER PUBLICATIONS

Search Report dated Jun. 28, 2018 of the corresponding European patent application.

* cited by examiner

*Primary Examiner* — Bobbak Safaipour
(74) *Attorney, Agent, or Firm* — Chun-Ming Shih; HDLS IPR Services

(57) ABSTRACT

A body information analysis apparatus capable of indicating shading-areas includes: an image capturing module (12) for capturing an external image; a processor (10) electrically connected to the imager capturing module (12), stored multiple face types and multiple indicating processes respectively corresponding to each of the face types, wherein the processor (10) determines a face type of a face when the face is recognized in the external image, and executes one of the multiple indicating processes corresponding to the determined face type, so as to indicate shading-areas on the face; and, a display module (111) electrically connected to the processor (10), for displaying the indicated shading-areas and the image of the face simultaneously.

16 Claims, 18 Drawing Sheets

BODY INFORMATION ANALYSIS APPARATUS CAPABLE OF INDICATING SHADING-AREAS

BACKGROUND OF THE INVENTION

1. Technical Field

The technical field relates to an analysis apparatus, and specifically relates to a body information analysis apparatus capable of indicating shading-areas

2. Description of Related Art

Applying cosmetics is an important one of multiple routine jobs for women.

Generally, a user usually sits in front of the mirror for applying cosmetics, or uses apparatuses having the camera and the monitor (such as smart phones, tablets, etc.) to substitute the traditional mirror for applying cosmetics.

However, the user can only check and confirm whether the makeup is done evenly or the color is appropriated or not by his/her bare eyes, that's why some users with less experiences may face the problem in slow makeup speed or terrible makeup quality.

According to the problem, users in this technical field seriously need an auxiliary apparatus, which may assist the users to apply cosmetics quickly and also to optimize the quality of the makeup.

SUMMARY OF THE INVENTION

The invention is directed to a body information analysis apparatus capable of indicating shading-areas, which may automatically indicate shading-areas on face images of users according to the face type of the users, so as to lead the users to apply shading more accurate upon exact positions.

In one of the exemplary embodiments of the present invention, the body information analysis apparatus capable of indicating shading-areas includes:

an image capturing module, for capturing an external image;

a processor, electrically connected with the image capturing module, recorded multiple face types and multiple indicating processes respectively corresponding to each of the face types, the processor recognizing the external image, and performing positioning actions to each facial feature of a face and determining a face type of the face once the face is recognized from the external image;

wherein, the processor executes a corresponding one of the indicating processes according to the determined face type of the recognized face for indicating shading areas on the face once the face is determined as one of the multiple recorded face types; and a display module, electrically connected with the processor, displaying the face in company with the indicated shading areas, wherein the displayed shading areas are overlapped with the displayed face.

As mentioned above, wherein the processor includes:

a face recognizing module (101), recognizing the external image for determining whether the face is present in the external image;

a positioning module (102), performing positioning actions to each facial feature of the face for determining the face type of the face; and an indicating module (103), executing the corresponding one of the indicating processes according to the determined face type for indicating the shading areas on the face.

As mentioned above, wherein the indicating module determines that the face is unnecessary to be improved once the face is determined as an oval face of the multiple recorded face types.

As mentioned above, wherein the indicating module performs a first indicating process for indicating the shading areas on the face once the face is determined as a round face of the multiple recorded face types.

As mentioned above, wherein the indicating module performs the first indicating process for executing following actions:

generating a first horizontal line upon peak points of eyebrows of the face;

generating a second horizontal line at two-thirds of height between the first horizontal line and a hairline of the face;

obtaining a first intersection point of the second horizontal line and a contour of the face;

generating a first vertical line through perpendicularly connecting the first intersection point with the first horizontal line;

obtaining a positioning point through moving the peak points of the eyebrows upward to middle height of the first vertical line;

generating a first auxiliary line through perpendicularly connecting the positioning point with the hairline;

generating a second auxiliary line through perpendicularly connecting a brow of the face with the first horizontal line;

generating a third auxiliary line through connecting the positioning point with an intersection point of the first horizontal line and the second auxiliary line;

constituting a forehead area of the shading areas based on the first auxiliary line, the second auxiliary line, and the third auxiliary line;

generating a fourth auxiliary line horizontally upon a lowest point of a mouth of the face;

generating a fifth auxiliary line perpendicularly downward from a corner of the mouth of the face;

constituting a chin area of the shading areas based on the fourth auxiliary line and the fifth auxiliary line;

generating a third horizontal line upon highest points of alae of a nose of the face;

obtaining a second intersection point of the third horizontal line and the contour of the face;

obtaining a third intersection point of the fifth auxiliary line and the lower contour of the face;

generating a sixth auxiliary line through connecting the second intersection point with the third intersection point; and constituting a jaw area of the shading areas based on the sixth auxiliary line.

As mentioned above, wherein the first indicating process indicates the forehead area and the chin area as bright areas, and indicates the jaw area as a dark area.

As mentioned above, wherein the indicating module performs a second indicating process for indicating the shading areas on the face once the face is determined as a square face of the multiple recorded face types.

As mentioned above, wherein the indicating module performs the second indicating process for executing following actions:

generating a first horizontal line upon brows of the face;

obtaining a first intersection point of the first horizontal line and a contour of the face;

generating a seventh auxiliary line through connecting the first intersection point with a hairline of the face;

constituting a forehead area of the shading areas based on the seventh auxiliary line;

generating a second horizontal line upon highest points of alae of a nose of the face;

obtaining a second intersection point of the second horizontal line and the contour of the face;

generating a first vertical line downward from a corner of a mouth of the face; obtaining a third intersection point of the first vertical line and the contour of the face;

generating a eighth auxiliary line through connecting the second intersection point with the third intersection point; and constituting a jaw area of the shading areas based on the eighth auxiliary line.

As mentioned above, wherein the second indicating process indicates the forehead area and the jaw area as dark areas.

As mentioned above, wherein the indicating module performs a third indicating process for indicating the shading areas on the face once the face is determined as a long face of the multiple recorded face types.

As mentioned above, wherein the indicating module performs the third indicating process for executing following actions:

generating a first horizontal line at middle height of a forehead of the face;

generating horizontally a ninth auxiliary line at half height between the first horizontal line and a hairline of the face;

constituting a forehead area of the shading areas based on the ninth auxiliary line;

generating a second horizontal line upon a lowest point of a mouth of the face;

generating horizontally a tenth auxiliary line at half height between the second horizontal line and a bottom of the face; and constituting a chin area of the shading areas based on the tenth auxiliary line.

As mentioned above, wherein the third indicating process indicates the forehead area and the chin area as dark areas.

As mentioned above, wherein the indicating module performs a fourth indicating process for indicating the shading areas on the face once the face is determined as an inverted triangular face or a diamond face of the multiple recorded face types.

As mentioned above, wherein the indicating module performs the fourth indicating process for executing following actions:

generating a first horizontal line upon lower points of eyes of the face;

obtaining a first intersection point of the first horizontal line and a contour of the face;

generating an eleventh auxiliary line through connecting the first intersection point with a hairline of the face;

constituting a forehead area of the shading areas based on the eleventh auxiliary line;

generating a second horizontal line upon a lowest point of a nose of the face;

obtaining a second intersection point of the second horizontal line and the contour of the face;

generating a first vertical line downward from a corner of a mouth of the face;

obtaining a third intersection point of the first vertical line and the contour of the face;

generating a twelfth auxiliary line through connecting the second intersection point with the third intersection point; and constituting a jaw area of the shading areas based on the twelfth auxiliary line.

As mentioned above, wherein the fourth indicating process indicates the forehead area as a bright area, and indicates the jaw area as a dark area.

In comparison with related art, each embodiment disclosed in the present invention may provide a face image of the user when he or she is applying cosmetics through the body information analysis apparatus, and the user may obtain recommended shading-areas upon the face image, so as to apply shading upon exact positions on his or her own face.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
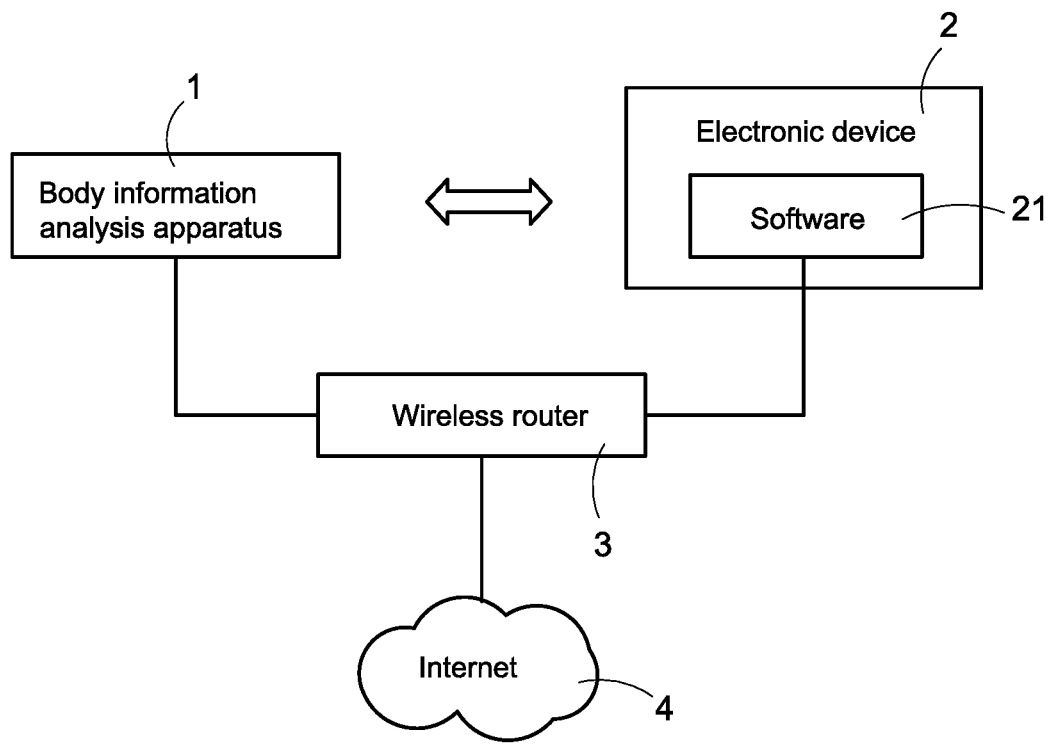
FIG. 1 is a schematic diagram of a system according to a first embodiment of the present invention.
Figure 2:
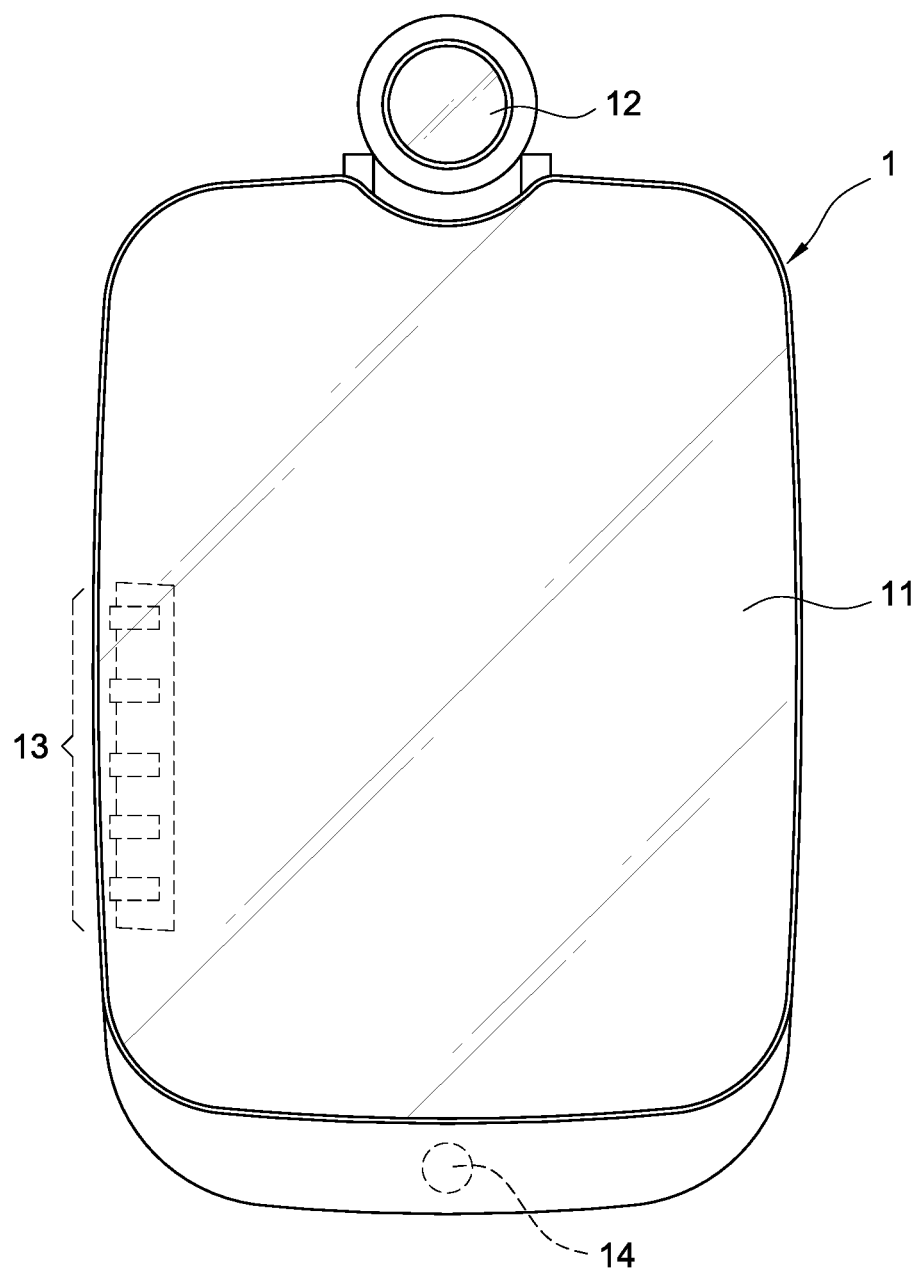
FIG. 2 is a schematic diagram of an analysis apparatus according to a first embodiment of the present invention.
Figure 3:
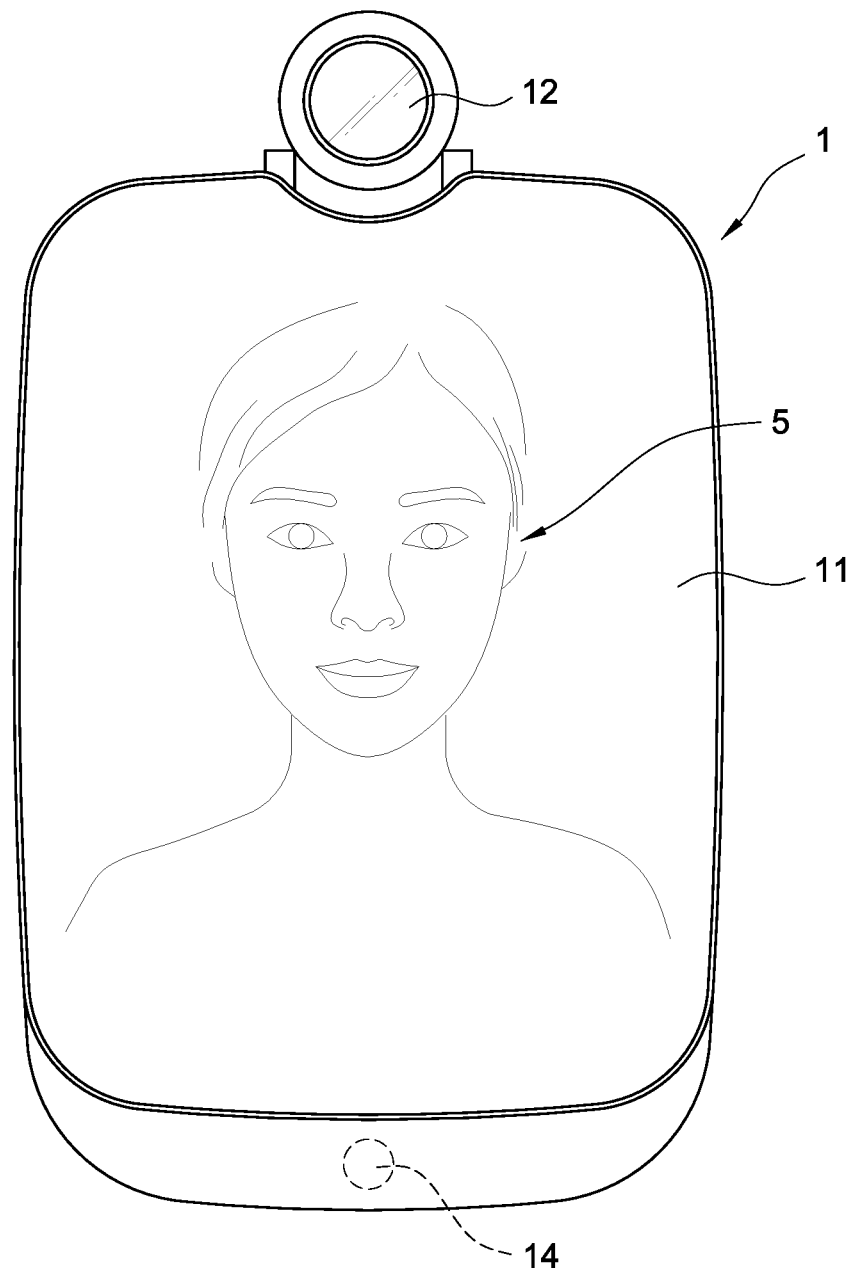
FIG. 3 is a schematic diagram of the analysis apparatus according to a second embodiment of the present invention.

FIG. 1 is a schematic diagram of a system according to a first embodiment of the present invention. The present invention discloses a body information analysis apparatus capable of indicating shading-areas (referred to as the analysis apparatus 1 hereinafter). The analysis apparatus 1 is used to perform a shading-areas indicating method (referred to as the indicating method hereinafter), which assists a user in applying shading-areas on his or her own face more quickly and accurately.

In one embodiment, the user may perform setting on the analysis apparatus 1 through operating an electronic device 2. In particular, if the analysis apparatus 1 and the electronic device 2 are connecting to same wireless router 3, they can establish a wireless connection through the wireless router 3. Besides, the analysis apparatus 1 and the electronic device 2 may pair or connect directly through other wireless communication protocols (e.g., Bluetooth pairing, Zigbee connecting, RF connection, etc.), so as to transmit data, commands and signals with each other.

As shown in FIG. 1, the electronic device 2 is installed with a software 21. In particular, the software 21 may interconnect with the analysis apparatus 1 (for example, the software 21 may be an application program created and provided by the manufacturer of the analysis apparatus 1). In the present invention, a user may operate the software 21 executed by the electronic device 2 for completing multiple setting actions on the analysis apparatus 1 (such as registering face information, setting default values, etc.).

In one embodiment, the analysis apparatus 1 may connect to the wireless router 3 arranged in same area, and connects to the Internet 4 through the wireless router 3. Therefore, the analysis apparatus 1 may perform firmware updating, data uploading, data downloading, etc. through the Internet 4. Besides, the analysis apparatus 1 may collect user's body information and transmit the body information to a remote computer (not shown) through the Internet 4. Therefore, the user may check the body information from a remote end, and an offsite backup purpose may also be accomplished.

In one embodiment, the analysis apparatus 1 may connect to the wireless router 3 arranged in same area, and connects to the Internet 4 through the wireless router 3. Therefore, the analysis apparatus 1 may perform firmware updating, data uploading, data downloading, etc. through the Internet 4. Besides, the analysis apparatus 1 may collect user's body information and transmit the body information to a remote computer (not shown) through the Internet 4. Therefore, the user may check the body information from a remote end, and an offsite backup purpose may also be accomplished.

The analysis apparatus 1 includes a mirror screen 11. The analysis apparatus 1 displays a graphical user interface (GUI) through the mirror screen 11 for interacting with the user 5 while it is turned on. When the analysis apparatus 1 is turned off, the mirror screen 11 can also be deemed and used as a regular mirror for reflecting the face look of the user 5. One of the main objectives of the present invention is to assist the user 5 in applying cosmetics through the analysis apparatus 1. For doing so, the mirror screen 11 may simultaneously reflect the face look of the user 5 and display the GUI. Therefore, the analysis apparatus 1 may analyze the make-up of the user 5 while the user 5 is applying cosmetics for providing assistances to the user 5 (detailed described in the following).

In one embodiment, the mirror screen 11 may be a touch screen, and the user 5 may perform data input on the analysis apparatus 1 through the mirror screen 11.

The analysis apparatus 1 further includes an image capturing module 12, which is arranged on the analysis apparatus 1 and is adjustable for its setting angle. In one embodiment, the image capturing module 12 may capture high-resolution images for the user 5 (such as face images, neck images, hands images, etc.). Therefore, the analysis apparatus 1 may analyze body information and make-up progress of the user 5 through the captured images. In another embodiment, the image capturing module 12 may capture external messages (such as barcodes, QR codes, etc.), and the analysis apparatus 1 may obtain necessary data according to the content of the captured external messages.

The analysis apparatus 1 further includes multiple buttons 13. In one embodiment, the multiple buttons 13 may be physical buttons or touch keys, not limited thereto. The user 5 may operate the GUI (for example, controls the GUI to go back to a home page, to perform a pageup function, to perform a pagedown function, etc.), or leads the analysis apparatus 1 to quickly trigger corresponding functions (for example, turns on the mirror screen 11, turns off the mirror screen 11, turns on the image capturing module 12, etc.), by way of pressing the buttons 13.

The analysis apparatus 1 further includes one or more sensors 14 (such as temperature sensors, humility sensors, etc.). The sensors 14 are used to detect the environment values around the position where the analysis apparatus 1 is arranged. Therefore, the accuracy of the body information of the user 5 detected and analyzed by the analysis apparatus 1 may be enhanced in accordance with the sensor data. For an instance, if the sensors 14 comprise a pyroelectric infrared radial (PIR) sensor, it can detect whether the user 5 is entering the field of usage of the analysis apparatus 1 in any time. Therefore, the analysis apparatus 1 may leave the standby mode correspondingly for activating the image capturing module 12 for capturing the face image of the user 5 and performing the following analysis processes.

In another embodiment, the above sensors 14 may include a motion sensor. The analysis apparatus 1 may detect user's moving gesture (such as waving left, waving right, waving up, waving down, pushing forward, pulling backward, etc.) through the motion sensor. Therefore, the user 5 may perform data input on the analysis apparatus 1 through the moving gestures without physically touching the aforementioned mirror screen 11 or the buttons 13, so as to prevent the mirror screen 11 and the buttons 13 from retaining fingerprints.

Figure 4:
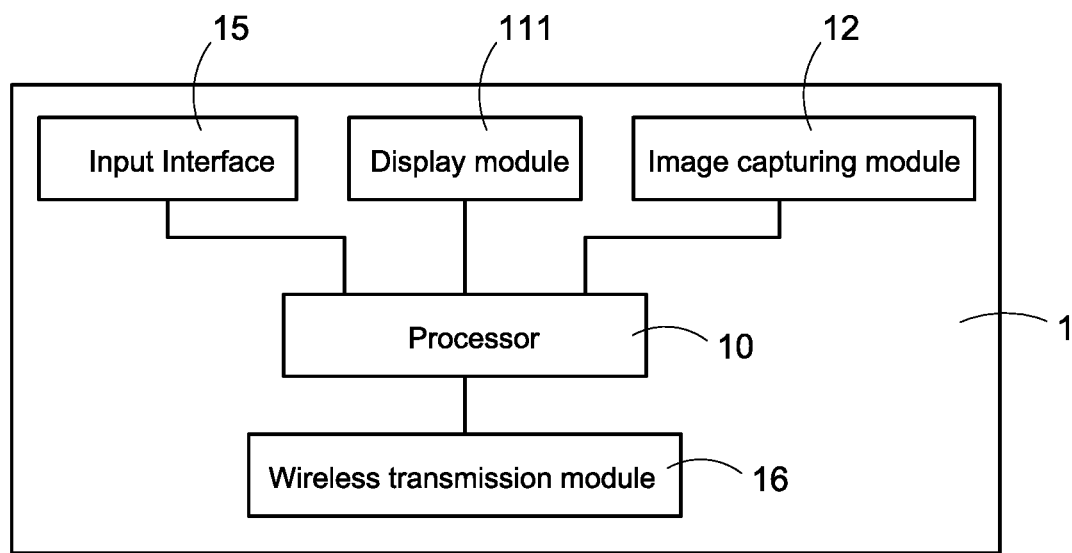
FIG. 4 is a block diagram of the analysis apparatus according to a third embodiment of the present invention.

FIG. 4 is a block diagram of the analysis apparatus according to a third embodiment of the present invention. As shown in FIG. 4, the analysis apparatus 1 mainly includes a processor 10, a display module 111, the image capturing module 12, an input interface 15, and a wireless transmission module 16, wherein the display module 111, the image capturing module 12, the input interface 15, and the wireless transmission module 16 are electrically connected with the processor 10.

In one embodiment, the image capturing module 12 may be a camera. The image capturing module 12 is used to capture external images and messages and provides the captured images and the captured messages to the analysis apparatus 1. The analysis apparatus 1 may perform recognitions on the user 5 through the captured images (for example, a face recognition, a neck recognition, a hand recognition, etc.) so as to analyze each feature of the user 5 (such as the face, the neck, the hand, etc.). Also, the analysis apparatus 1 may also perform relative setting actions through the content of the captured messages.

The display module 111 is used to display the aforementioned GUI. In one embodiment, the display module 111 is arranged inside the mirror screen 11. When the display module 111 is turned on, the light emitted from the display module 111 may penetrate through the mirror screen 11 and the GUI may be displayed right on the mirror screen 11. When the display module 111 is turned off, the user may regard and use the mirror screen 11 as a regular mirror. In one embodiment, the analysis apparatus 1 may adjust the light strength or the display area of the display module 111, thus the mirror screen 11 may simultaneously reflect the image of the user and also display the GUI thereon.

The analysis apparatus 1 may receive external input through the input interface 15, so the user may interact with the GUI or perform necessary settings on the analysis apparatus 1. In one embodiment, the input interface 15 may be the aforementioned sensors 14, so as to detect the gesture inputs from the user. In another embodiment, the input interface 15 may be the image capturing module 12, so as to capture the external images or the external messages. In a further embodiment, the input interface 15 may be the touch screen or the buttons 13, so as to receive input actions directly from the user. In another further embodiment, the input interface 15 may be a microphone, so as to receive external audio.

The wireless transmission module 16 assists the analysis apparatus 1 to connect to the Internet 4. In particular, the user may connect to the analysis apparatus 1 from a remote end through the Internet 4 to check each information recorded in the analysis apparatus 1 (such as the body information of the user) in any time.

The processor 10 is connected to the display module 111, the image capturing module 12, the input interface 15, and the wireless transmission module 16, and the processor 10 may include computer executable program codes (not shown). Upon executing the computer executable program codes, the processor 10 may control all the above modules of the analysis apparatus 1 and performs the indicating method of the present invention.

Figure 5:
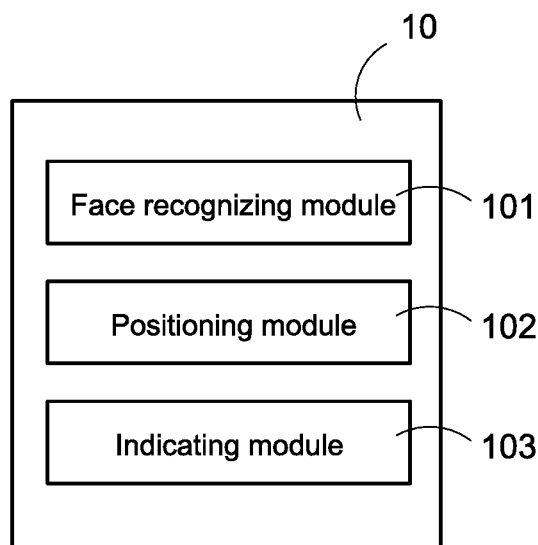
FIG. 5 is a schematic diagram of a processor according to a first embodiment of the present invention.

Refer to FIG. 5, which is a schematic diagram of a processor according to a first embodiment of the present invention. In particular, the processor 10 accomplishes each function of the indicating method of the present invention through executing the aforementioned computer executable program codes, and the computer executable program codes may be divided into multiple function modules set forth below according to different functions:

1. A face recognizing module 101, which is used to recognize the external image captured by the image capturing module 12, so as to determine whether a face is present in the external image;

2. A positioning module 102, which is used to perform positioning actions on the face presented in the external image through an algorithm, so as to obtain the positions of each facial feature of the face. Also, the positioning module 102 further determines a face type of the face; and 3. An indicating module 103, which is used to perform corresponding process according to the face type of the face determined by the positioning module 102, so as to indicate exact and recommended shading areas upon the face.

In this embodiment, the processor 10 may record multiple face types in advance. After the positioning actions, the positioning module 102 may recognize at least six face types including an oval face, a round face, a square face, a long face, an inverted triangular face, and a diamond face, but not limited thereto.

The processor 10 may further record multiple indicating processes respectively corresponding to each of the face types set forth above. Each of the multiple indicating processes is respectively used to indicate the shading areas on different face type, and each of the multiple indicating processes executes different indicating steps respectively.

In particular, the indicating module 103 may perform a first indicating process on the face to indicate the shading areas if the face is recognized as a round face, may perform a second indicating process on the face to indicate the shading areas if the face is recognized as a square face, may perform a third indicating process on the face to indicate the shading areas if the face is recognized as a long face, and may perform a fourth indicating process on the face to indicate the shading areas if the face is recognized as an inverted triangular face or a diamond face. It should be mentioned that if the face is recognized as an oval face, the indicating module 103 may deem the face as if it doesn't need further improvement and omits indicating any of the shading areas on the face. However, the above descriptions are just few embodiments of the present invention, not intended to limit the scope of the present invention.

When the user is facing the analysis apparatus 1, the analysis apparatus 1 may obtain an external image that includes the image of the user through the image capturing module 12. Next, the analysis apparatus 1 fetches a face image of the user from the external image through the face recognizing module 101 of the processor 10, and recognizes the face type of the face image through the positioning module 102 of the processor 10. Next, the analysis apparatus 1 may perform a corresponding one of the multiple indicating processes according to the face type through the indicating module 103 of the processor 10, so as to indicate the shading areas of the face image.

Figure 12:
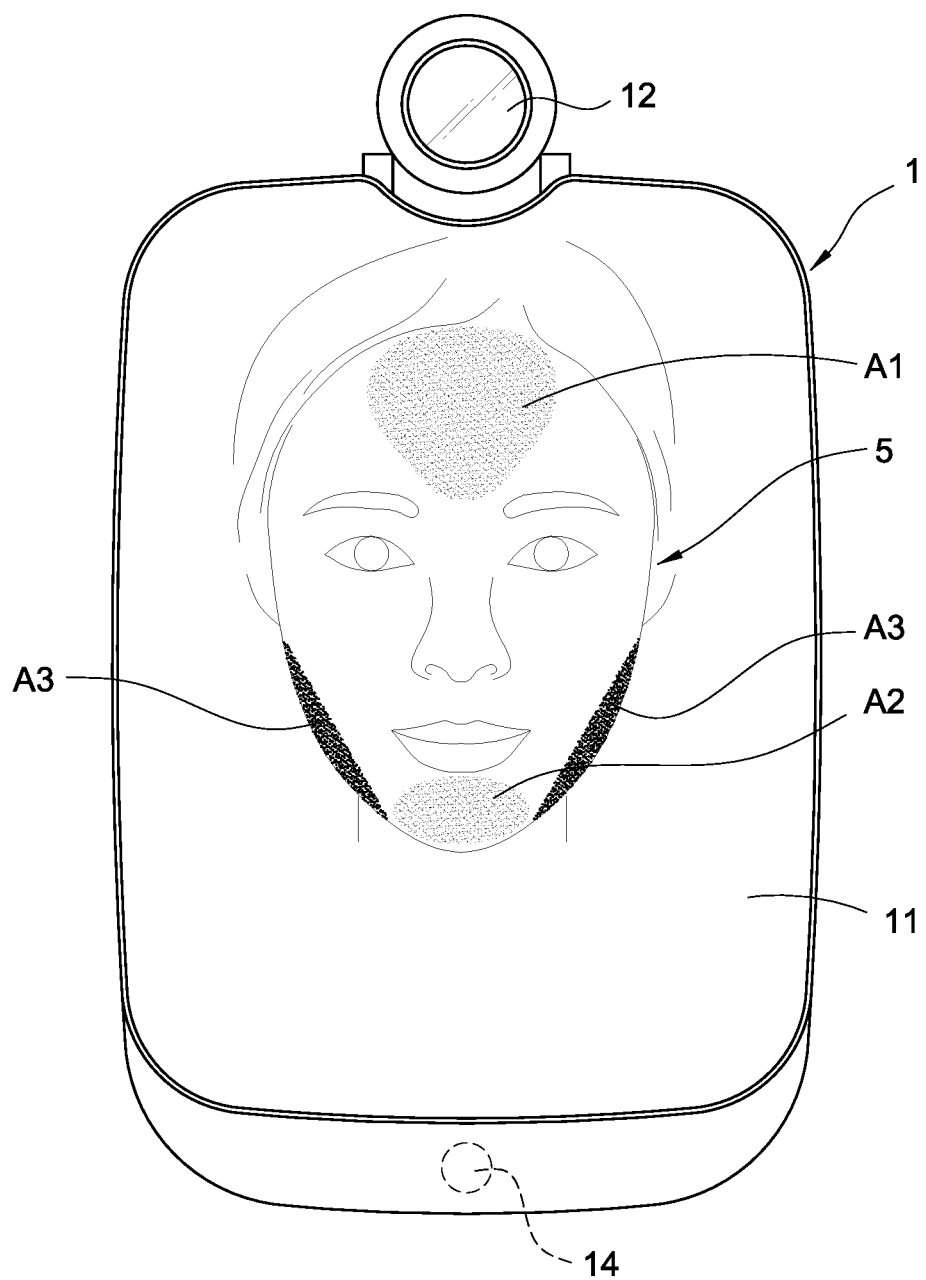
FIG. 12 is a schematic diagram of the analysis apparatus according to a fourth embodiment of the present invention.

Accordingly, the analysis apparatus 1 may reflect the face look of the user through the mirror screen 11, and simultaneously displays the indicated shading areas on the face look through the display module 111 (as shown in FIG. 12, the displayed face image is overlapped with the displayed shading areas). Therefore, the user may apply cosmetics according to the shading areas displayed on the display module 111 of the analysis apparatus 1, so as to quickly apply shading on the exact positions of the face.

Figure 6A:
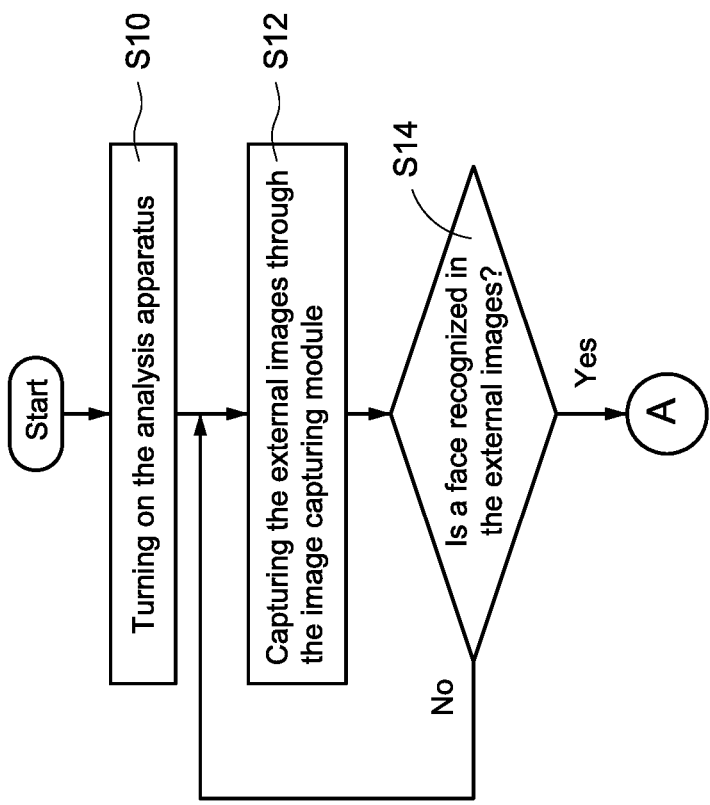
FIG. 6A is a first indicating flowchart according to a first embodiment of the present invention.
Figure 6B:
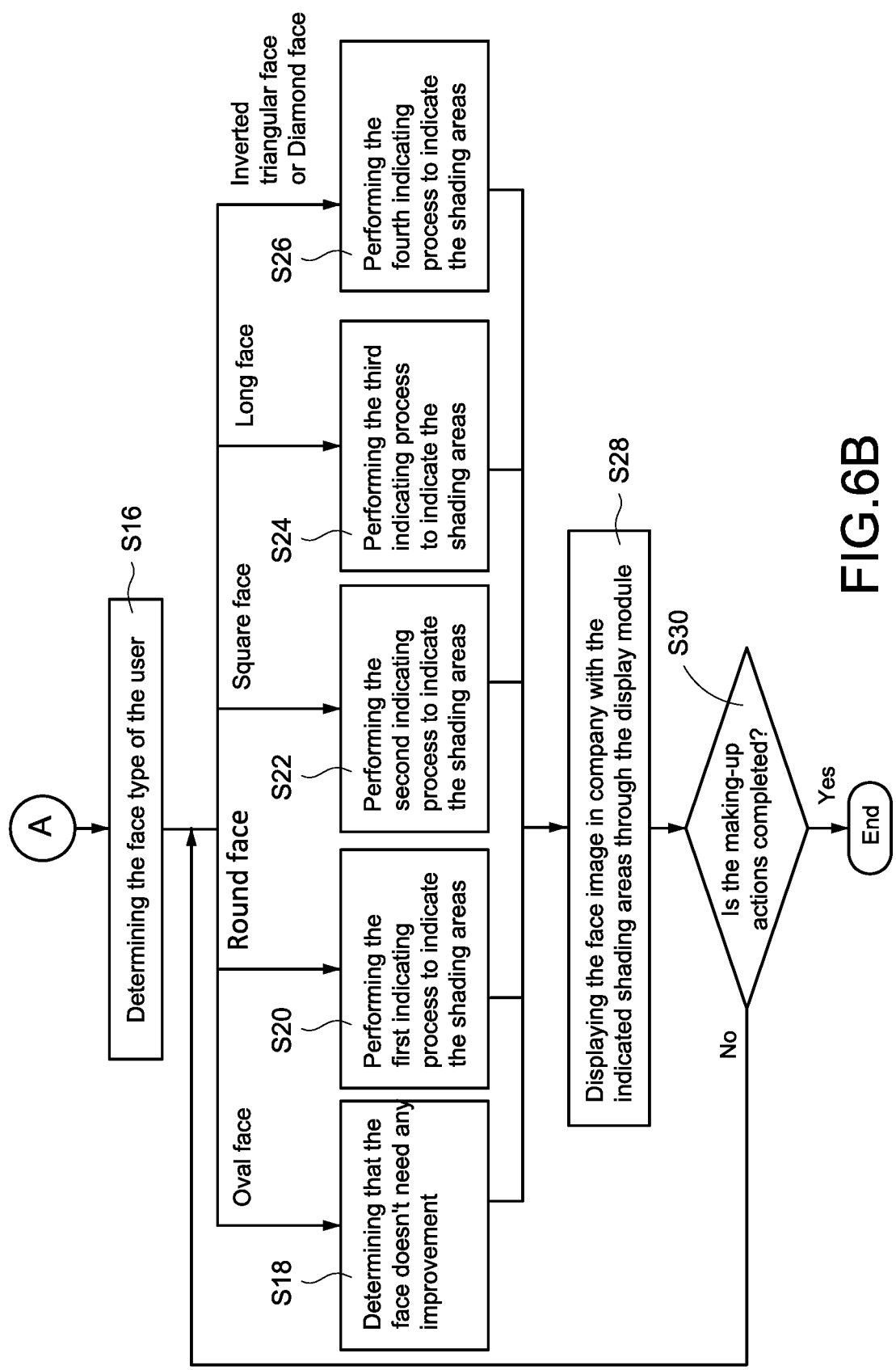
FIG. 6B is a second indicating flowchart according to the first embodiment of the present invention.

Refer to FIG. 6A and FIG. 6B, wherein FIG. 6A is a first indicating flowchart according to a first embodiment of the present invention, and FIG. 6B is a second indicating flowchart according to the first embodiment of the present invention. FIG. 6A and FIG. 6B are used to describe each step of the indicating method of the present invention, and these steps are in particular adopted by the analysis apparatus 1 as shown in FIG. 1 to FIG. 5. More specific, the analysis apparatus 1 executes aforementioned computer executable program codes (i.e., the above function modules 101-103) through the processor 10 for accomplishing each step as described in the following.

As shown in FIG. 6A, to perform the indicating method through the analysis apparatus 1 of the present invention for assisting the user in applying cosmetics, the user first turns the analysis apparatus 1 on (step S10). In one embodiment, the user may trigger the touch screen or the buttons 13 to turn the analysis apparatus 1 on. In another embodiment, the analysis apparatus 1 may automatically enter a standby mode after receiving power, and the user may input gestures through the image capturing module 12 or the sensors 14 for activating the analysis apparatus 1 from the standby mode, but not limited thereto.

In particular, the analysis apparatus 1 may include multiple modes capable of different functions. In one embodiment, the analysis apparatus 1 is automatically entering an auxiliary mode for assisting the user in applying cosmetics after it is turned on. In another embodiment, the analysis apparatus 1 may automatically enter the standby mode after it is turned on, and enters the auxiliary mode after receiving the corresponding command from the user.

After being turned on, the analysis apparatus 1 keeps capturing external images through the image capturing module 12 (step S12), and the processor 10 of the analysis apparatus 1 keeps determining whether a face is present in the captured external images (step S14). In one embodiment, the processor 10 obtains an external image from the image obtaining module 12, and performs a face recognition on the external image through the face recognizing module 101, so as to determine whether a face is present in the external image or not.

If no face is present in the external image, the analysis apparatus 1 re-executes the step S12 and the step S14 for continually capturing and analyzing external images. For example, if only a bed, a door, or a chair is present in the captured external image (means there's no human exists in the bedroom), or only the body or the back of the user is present in the captured external image (means the user doesn't want to use the analysis apparatus 1), the analysis apparatus 1 will not perform the indicating method of the present invention.

As shown in FIG. 6B, if the processor 10 determines that a face is present in the external image, it then performs positioning actions on each part of the face (basically on each facial feature of the user) and determines the face type of the face (step S16). In one embodiment, the processor 10 may further determine if the size of the face is larger than a specific ratio or not (for example, the face occupies the entire external image more than 40%) after the face is determined present in the external image. In the scenario, the process 10 performs the positioning actions on the face and determines the face type only if the size of the face in the external image is larger than the specific ratio.

In one embodiment, the processor 10 renders a face image of the face to the aforementioned positioning module 102 after the face is determined present in the external image, and performs the positioning actions on the face image for recognizing the face type of the face through the positioning module 102. In this embodiment, the positioning module 102 may determine the face type according to several parameters of the face, such as the relative positions of each facial feature of the face, and the ratio of each facial feature of the face. Therefore, the positioning module 102 may recognize several face types, at least including an oval face, a round face, a square face, a long face, an inverted triangular face, a diamond face, etc.

It should be noted that the positioning module 102 in the embodiment may perform the positioning actions on each facial feature of the face through a Dlib Face Landmark system, but not limited thereto.

Figure 7:
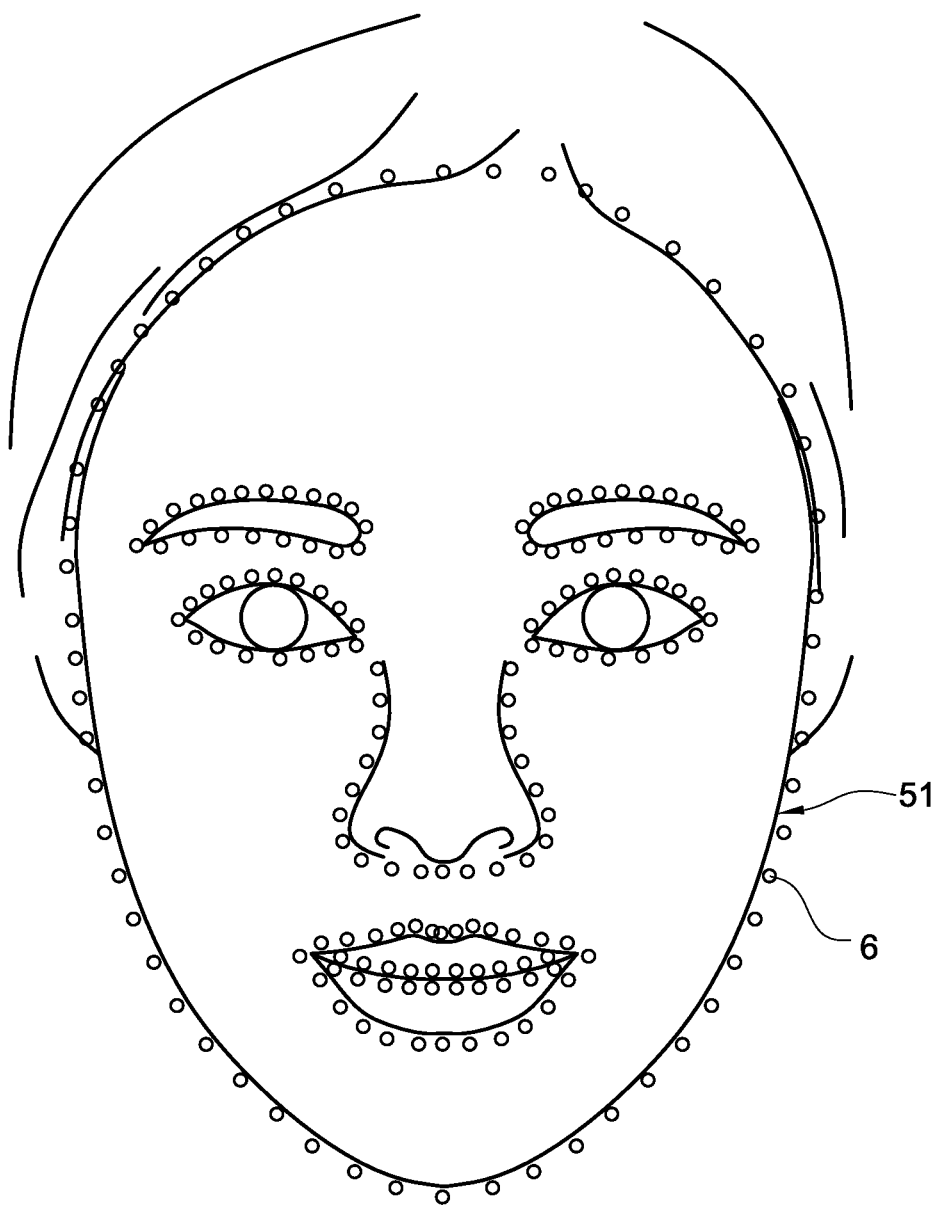
FIG. 7 is a schematic diagram for positioning a face.

FIG. 7 is a schematic diagram for positioning a face. When determining that a face 51 is present in the external image, the processor 10 further performs analysis on the image of the face 51 through the Dlib Face Landmark system. The Dlib Face Landmark system is a common technical solution in the technical field, which can generate multiple positioning points 6 in the image of the face 51 after completing the analysis (such as 198 positioning points). Therefore, the Dlib Face Landmark system may figure out the positions of each facial feature of the face 51 according to the serial number, the shape, the order, etc. of the multiple positioning points 6 for accomplishing the positioning actions.

Also, the positioning module 102 may further determine the relative positions and the relative ratios among the multiple facial features of the face 51 according to the positions of the multiple positioning points 6, so as to figure out the face type of the face 51.

Refer back to FIG. 6B. After the step S16, the processor 10 may identify the face type of the aforementioned face and applies a corresponding indicating process according to the identified face type, so as to indicate the shading areas on the face for assisting the user in applying shading. In the embodiment, the processor 10 performs a first indicating process when identifying the face type as a round face, performs a second indicating process when identifying the face type as a square face, performs a third indicating process when identifying the face type as a long face, and performs a fourth indicating process when identifying the face type as an inverted triangular face or a diamond face, so as to indicate the shading areas for the users to apply shading. Also, the processor 10 may determine that the face is unnecessary to be improved when identifying the face type as an oval face and omits indicating any of the shading areas.

In a first embodiment, the processor 10 renders the identified face type to the aforementioned indicating module 103, and the indicating module 103 determines that the face doesn't need any improvement if the face type is identified as the oval face (step S18). Accordingly, the indicating module 103 doesn't execute the indicating actions for indicating any of the shading areas.

In a second embodiment, the processor 10 renders the identified face type to the aforementioned indicating module 103, and the indicating module 103 performs the first indicating process if the face type is identified as the round face, so as to indicate the shading areas on the face through the first indicating process (step S20).

In a third embodiment, the processor 10 renders the identified face type to the indicating module 103, and the indicating module 103 performs the second indicating process if the face type is identified as the square face, so as to indicate the shading areas on the face through the second indicating process (step S22).

In a fourth embodiment, the processor 10 renders the identified face type to the indicating module 103, and the indicating module 103 performs the third indicating process if the face type is identified as the long face, so as to indicate the shading areas on the face through the third indicating process (step S24).

In a fifth embodiment, the processor 10 renders the identified face type to the indicating module 103, and the indicating module 103 performs the fourth indicating process if the face type is identified as the inverted triangular face or the diamond face, so as to indicate the shading areas on the face through the fourth indicating process (step S26).

After the shading areas are indicated, the analysis apparatus 1 may display the image of the face of the user in company with the indicated shading areas through the display module 111, wherein the displayed face is overlapped with the displayed shading areas (step S28). Therefore, the user may check and ensure the positions of the shading areas upon the face for applying shading right through the mirror screen 11. It should be mentioned if the face is identified as an oval face by the processor 10 (i.e., the processor 10 determines that the face doesn't need further improvements), then the above step S28 may only display the image of the face.

Next, the analysis apparatus 1 determines whether the making-up actions of the user are completed or not (step S30). In one embodiment, the analysis apparatus 1 may determine that the making-up actions are completed if any event set forth below occurs: No face is present in the external image; The size of the face in the external image is smaller than a specific ratio; The user stops making up; The user triggers a stop button of the analysis apparatus 1 or inputs an interrupt gesture.

In the present invention, the analysis apparatus 1 may re-execute the step S18 to the step S28 before the making-up actions of the user are completed, so as to keep capturing the face image of the user, indicating the shading areas on the face image, and displaying the face image in company with the indicated shading areas on the mirror screen 11. Therefore, the analysis apparatus 1 of the present invention may accomplish the technical effect of dynamically analyzing and displaying the shading areas, i.e., the shading areas displayed on the mirror screen 11 may follow the movement of the face of the user captured by the analysis apparatus 1 and correspond to the correct positions of the face image, so the convenience for usage of the analysis apparatus 1 may be further improved.

Figure 8A:
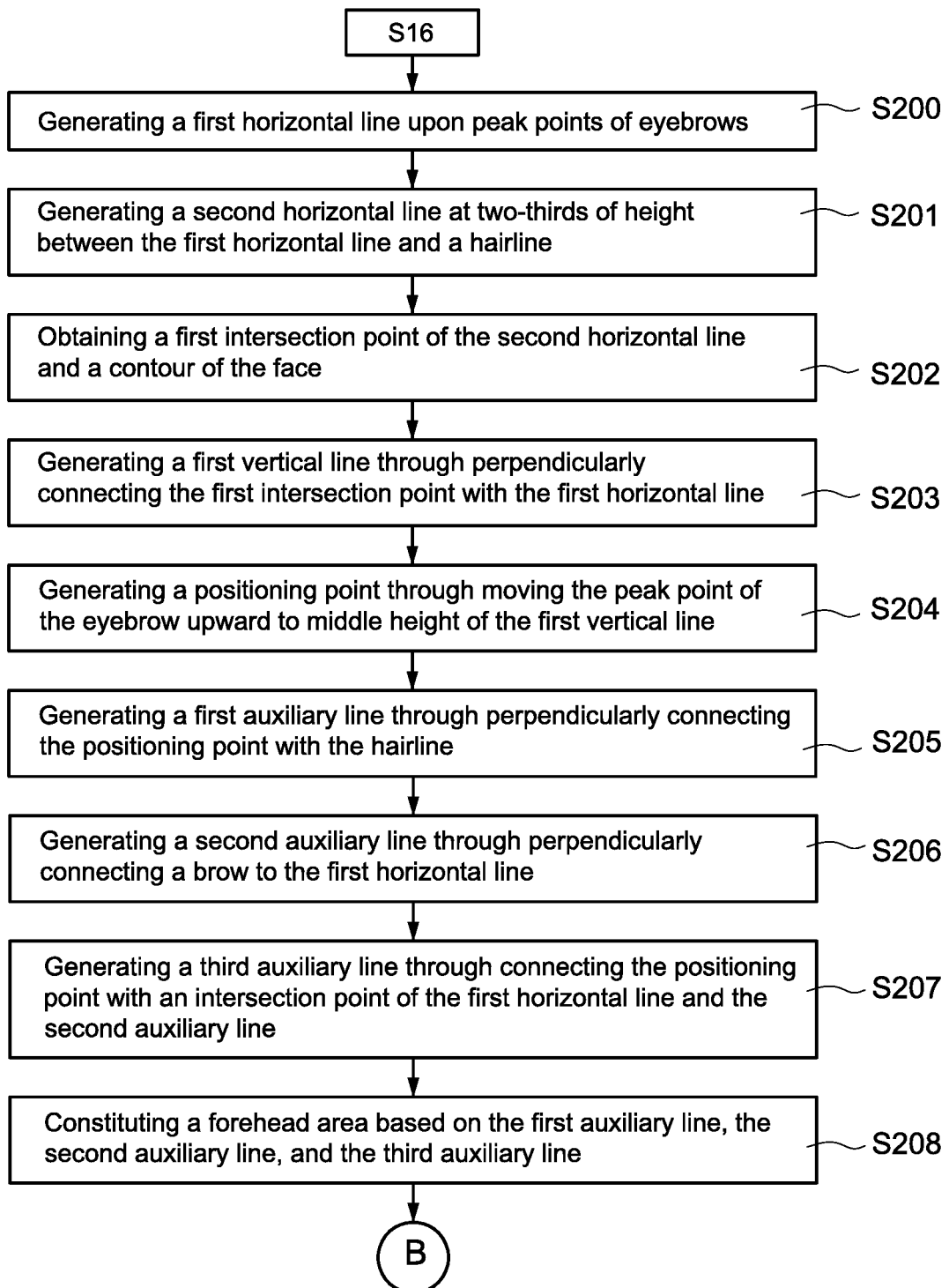
FIG. 8A is a first flowchart for indicating the shading areas according to a second embodiment of the present invention.
Figure 8B:
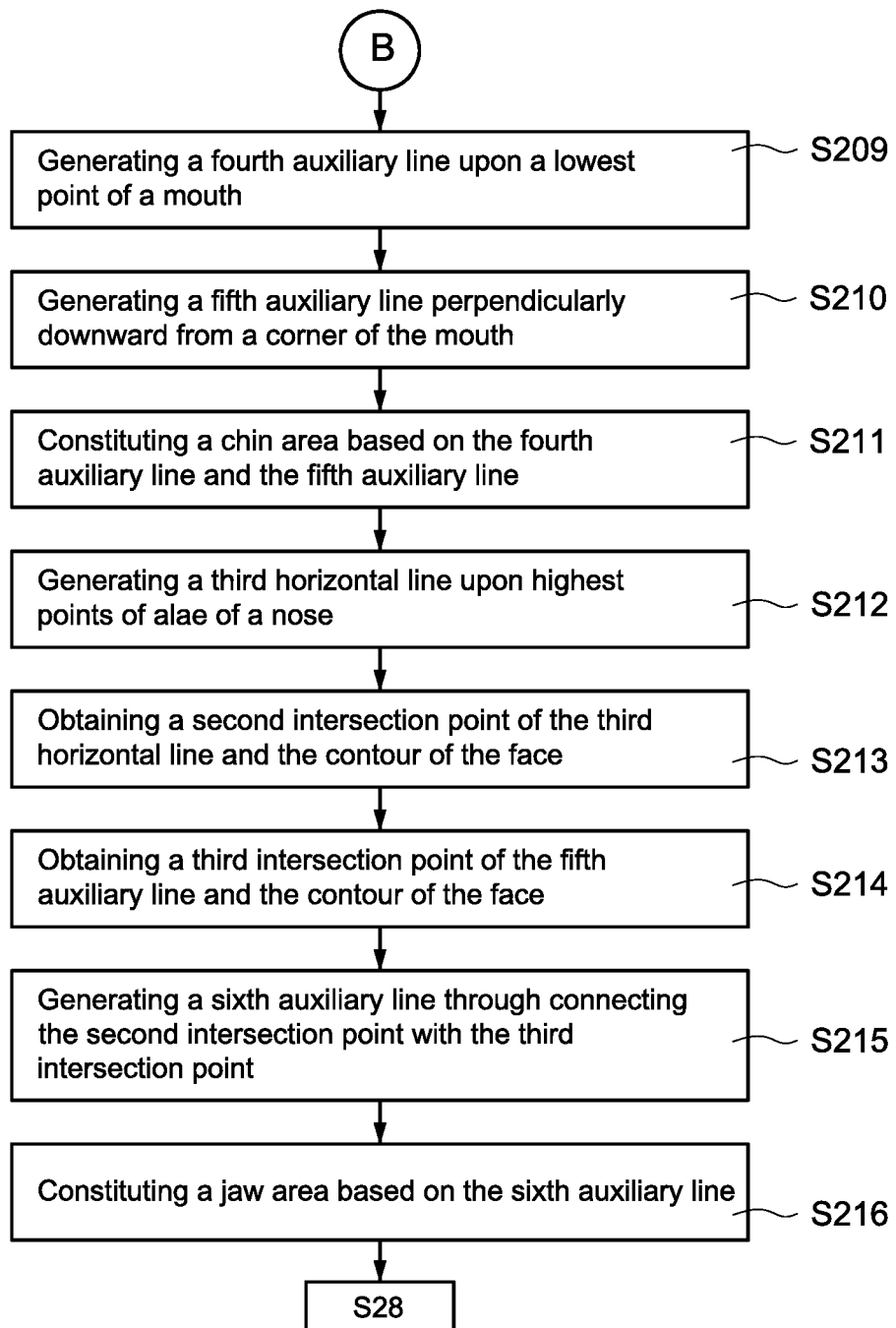
FIG. 8B is a second flowchart for indicating the shading areas according to the second embodiment of the present invention.
Figure 8C:
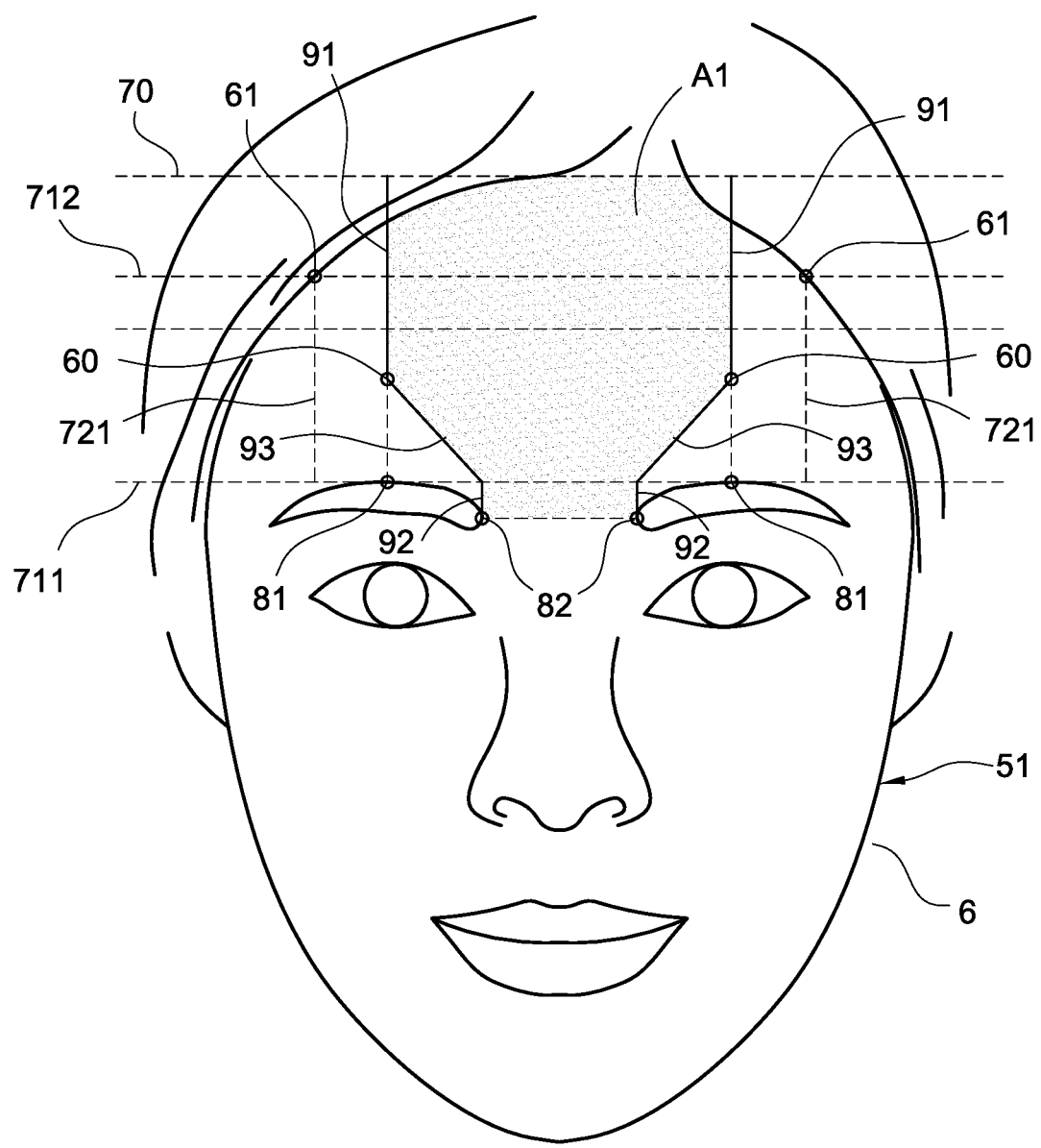
FIG. 8C is a first schematic diagram showing the shading areas according to the second embodiment of the present invention.
Figure 8D:
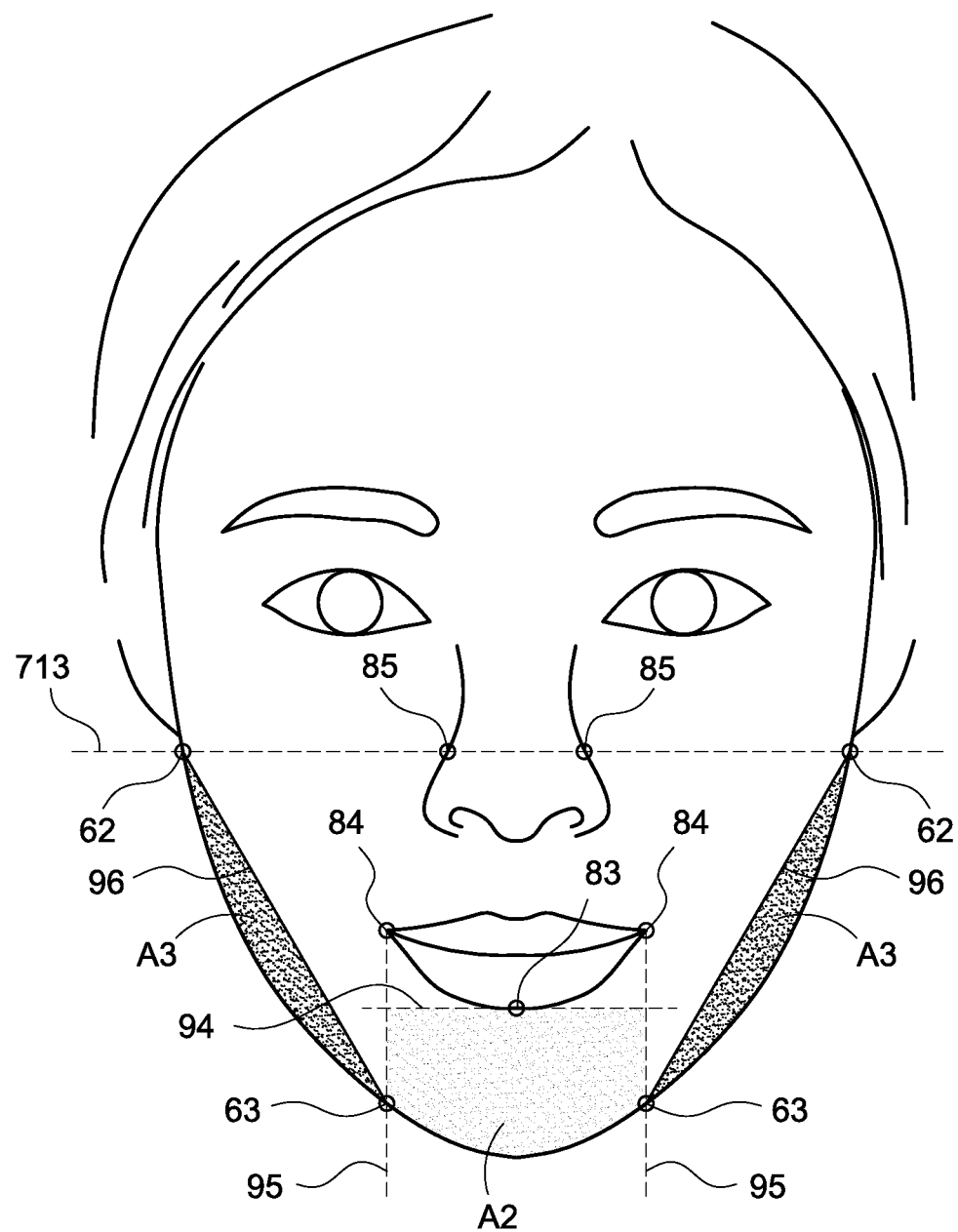
FIG. 8D is a second schematic diagram showing the shading areas according to the second embodiment of the present invention.

Refer to FIG. 8A to FIG. 8D. FIG. 8A is a first flowchart for indicating the shading areas according to a second embodiment of the present invention. FIG. 8B is a second flowchart for indicating the shading areas according to the second embodiment of the present invention. FIG. 8C is a first schematic diagram showing the shading areas according to the second embodiment of the present invention. FIG. 8D is a second schematic diagram showing the shading areas according to the second embodiment of the present invention.

FIG. 8A and FIG. 8B are used to describe how the indicating module 103 indicates the shading areas through the first indicating process in the above step S20 once the face type of the user is recognized as a round face by the positioning module 102 in the above step S16. More specific, the first indicating process is composed of the computer executable program codes recorded by the processor 10, and the indicating module 103 may perform each step shown in FIG. 8A and FIG. 8B while executing the first indicating process.

The following paragraphs are describing the first indicating process in company with FIG. 8C and FIG. 8D.

First, the indicating module 103 generates a first horizontal line 711 upon peak points of eyebrows 81 of the face (step S200), wherein the first horizontal line 711 is parallel with a peak point of a left eyebrow and another peak point of a right eyebrow of the face. Next, the indicating module 103 generates a second horizontal line 712 at two-thirds of height between the first horizontal line 711 and a hairline 70 of the face (step S201), and obtains a first intersection point 61 of the second horizontal line 712 and a contour of the face (step S202). In particular, the first intersection point 61 includes a left-first intersection point of the second horizontal line 712 and a left contour of the face and a right-first intersection point of the second horizontal line 712 and a right contour of the face.

Next, the indicating module 103 generates a first vertical line 721 through perpendicularly connecting the first intersection point 61 with the first horizontal line 712 (step S203). In particular, the first vertical line 721 includes a left-first vertical line generated through perpendicularly connecting the left-first intersection point with the first horizontal line 712 and a right-first vertical line generated through perpendicularly connecting the right-first intersection point with the first horizontal line 712. Next, the indicating module 103 generates a positioning point 60 through moving the peak points of the eyebrows upward to middle height of the first vertical line 721 (step S204). In particular, the positioning point 60 includes a left positioning point generated by moving the peak point of the left eyebrow upward to middle height of the left-first vertical line and a right positioning point generated by moving another peak point of the right eyebrow upward to middle height of the right-first vertical line.

After the step S204, the indicating module 103 generates a first auxiliary line 91 through perpendicularly connecting the positioning point 60 with the hairline 70 (step S205). In particular, the first auxiliary line 91 includes a left-first auxiliary line generated through perpendicularly connecting the left positioning point with the hairline 70 and a right-first auxiliary line generated through perpendicularly connecting right positioning point with the hairline 70. Next, the indicating module 103 generates a second auxiliary line 92 through perpendicularly connecting a brow of the face 82 to the first horizontal line 711 (step S206). In particular, the second auxiliary line 92 includes a left-second auxiliary line generated through perpendicularly connecting a left brow of the face with the first horizontal 711 and a right-second auxiliary line generated through perpendicularly connecting a right brow of the face with the first horizontal line 711.

Finally, the indicating module 103 generates a third auxiliary line 93 through connecting the positioning point 60 with an intersection point of the first horizontal line 711 and the second auxiliary line 92 (step S207). In particular, the third auxiliary line 93 includes a left-third auxiliary line generated through connecting the left positioning point with an intersection point of the first horizontal line 711 and the left-second auxiliary line and a right-third auxiliary line generated through connecting the right positioning point with another intersection point of the first horizontal line 711 and the right-second auxiliary line 92. Therefore, the indicating module 103 may constitute a forehead area A1 of the aforementioned shading areas of the face based on the first auxiliary line 91, the second auxiliary line 92, and the third auxiliary line 93 (step S208).

More specific, the forehead area A1 is the area surrounded by the left-first auxiliary line, the left-second auxiliary line, the left-third auxiliary line, the right-first auxiliary line, the right-second auxiliary line, the right-third auxiliary line, and the upper contour of the face.

As shown in FIG. 8B and FIG. 8D, the indicating module 103 further generates a fourth auxiliary line 94 horizontally upon a lowest point of a mouth 83 of the face (step S209), and perpendicularly generates a fifth auxiliary line 95 downward from a corner of the mouth 84 (step S210). In particular, the fifth auxiliary line 95 includes a left-fifth auxiliary line perpendicularly generated downward from a left corner of the mouth and a right-fifth auxiliary line perpendicularly generated downward from a right corner of the mouth. Therefore, the indicating module 103 may constitute a chin area A2 of the aforementioned shading areas of the face based on the fourth auxiliary line 94 and the fifth auxiliary line 95 (step S211).

More specific, the chin area A2 is the area surrounded by the fourth auxiliary line 94, the left-fifth auxiliary line, the right-fifth auxiliary line, and a lower contour of the face.

Further, the indicating module 103 generates a third horizontal line 713 upon highest points of alae of a nose 85 of the face (step S212), and obtains a second intersection point 62 of the third horizontal line 713 and the contour of the face (step S213). In particular, the third horizontal line 713 is parallel with a highest point of a left ala of the nose and another highest point of a right ala of the nose. The second intersection point 62 includes a left-second intersection point of the third horizontal line 713 and the left contour of the face and a right-second intersection point of the third horizontal line 713 and the right contour of the face.

Next, the indicating module 103 obtains a third intersection point 63 of the fifth auxiliary line 95 and the contour of the face (step S214). In particular, the third intersection point 63 includes a left-third intersection point of the left-fifth auxiliary line and the contour of the face and a right-third intersection point of the right-fifth auxiliary line and the contour of the face. Finally, the indicating module 103 generates a sixth auxiliary line 96 through connecting the second intersection point 62 with the third intersection point 63 (step S215), wherein the sixth auxiliary line 96 includes a left-sixth auxiliary line generated through connecting the left-second intersection point with the left-third intersection point and a right-sixth auxiliary line generated through connecting the right-second intersection point with the right-third intersection point.

Finally, the indicating module 103 may constitute a jaw area A3 of the aforementioned shading areas of the face based on the sixth auxiliary line 96 (step S216). More specific, the jaw area A3 in the present embodiment includes an area surrounded by the left-sixth auxiliary line and the lower contour of the face and another area surrounded by the right-sixth auxiliary line and the lower contour of the face.

However, the indicating module 103 of the present invention does not have a fixed order for indicating the forehead area A1, the chin area A2, and the jaw area A3. The indicating module 103 may perform indicating in an arbitrary order according to the algorithm, or may indicate multiple areas simultaneously via multiplexing, not limited thereto.

It should be mentioned that the embodiment shown in FIG. 8A to FIG. 8D is used to assist the users who having a round face to apply shading. In this embodiment, the indicating module 103 may indicate the forehead area A1 and the chin area A2 as bright areas, so as to suggest the user to apply bright cosmetics on these areas. Also, the indicating module 103 may further indicate the jaw area A3 as a dark area, so as to suggest the user to apply dark cosmetics on this area. Therefore, the user may achieve better effect in applying shading.

Figure 9A:
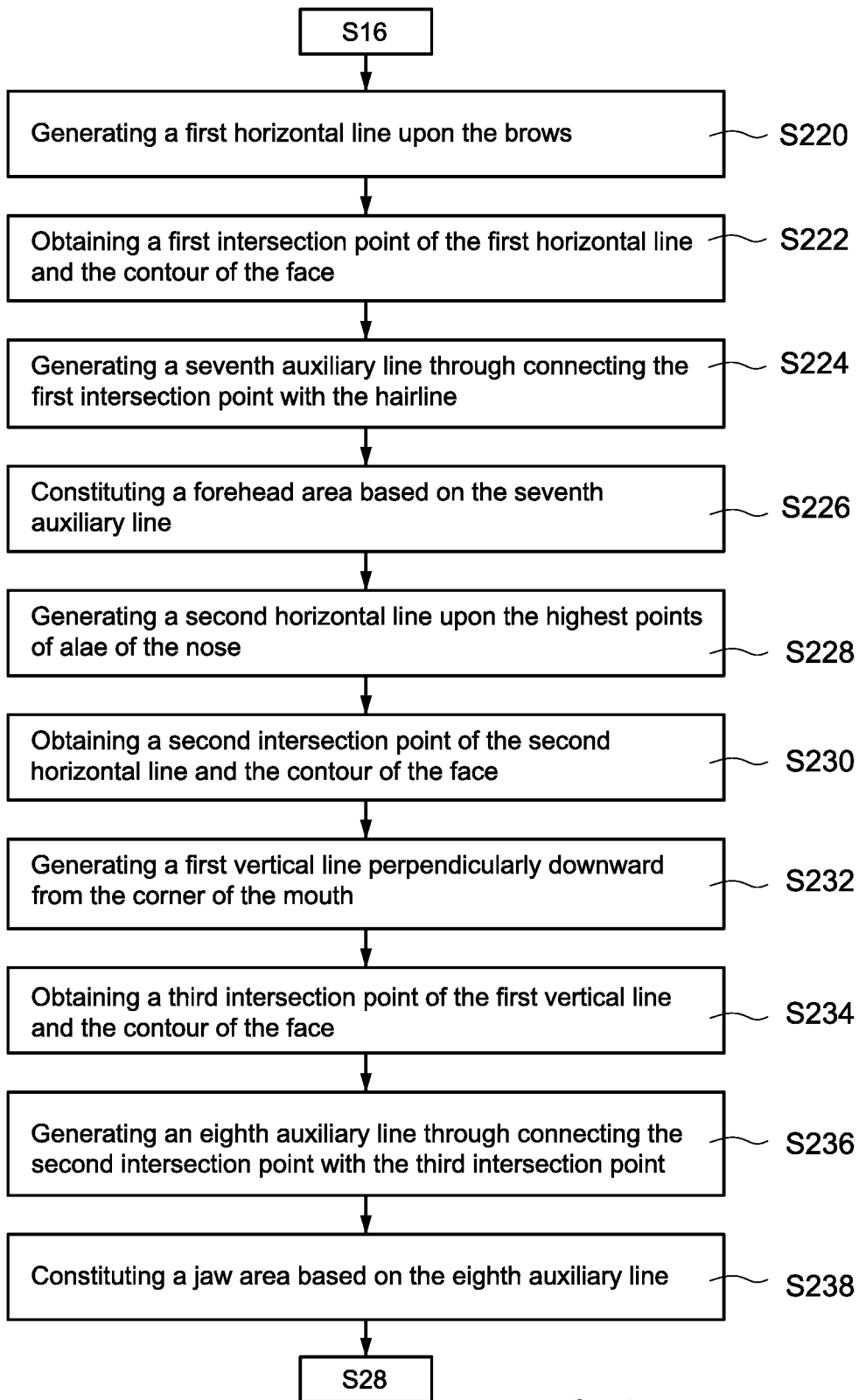
FIG. 9A is a flowchart for indicating the shading areas according to a third embodiment of the present invention.
Figure 9B:
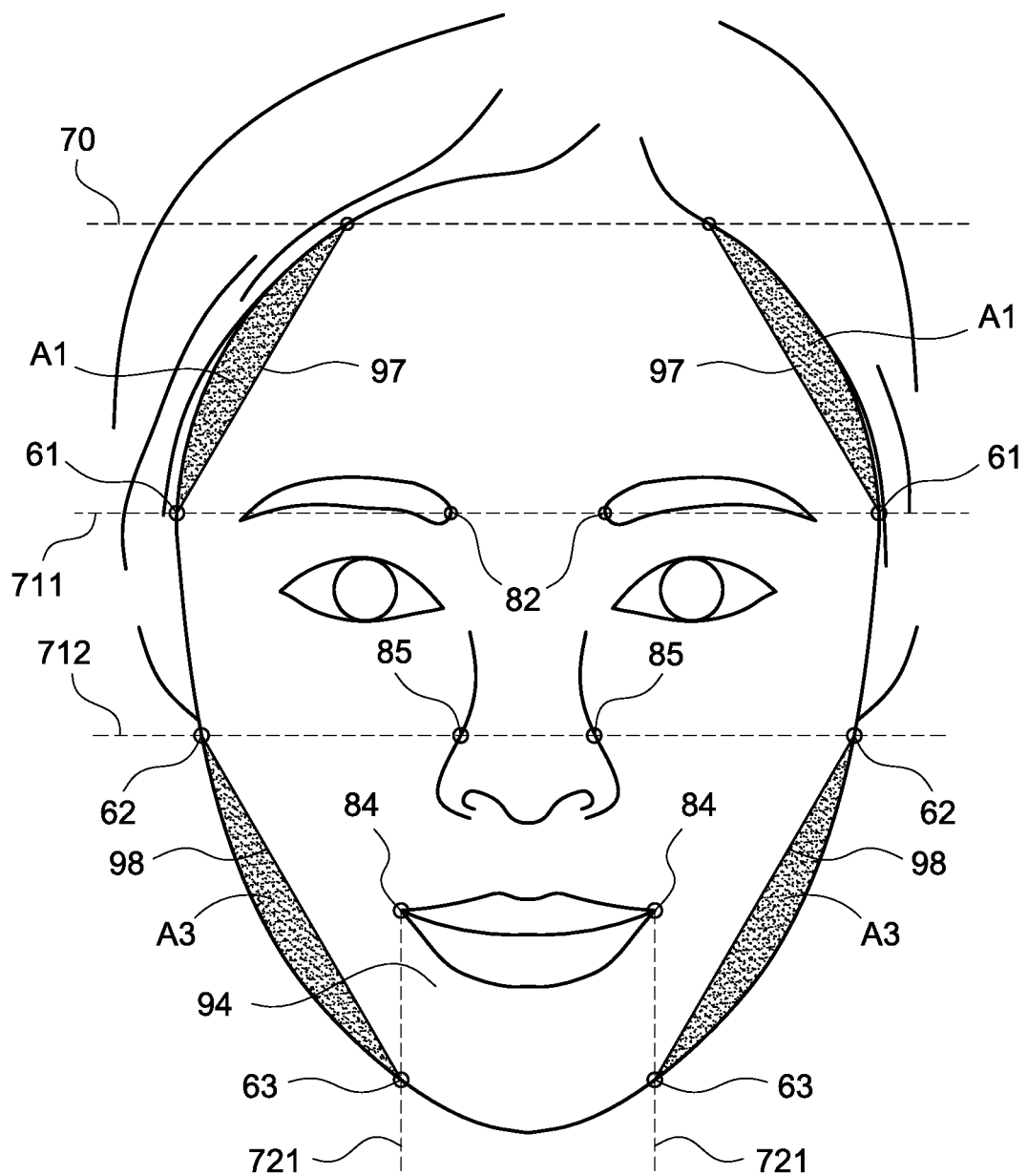
FIG. 9B is a schematic diagram showing the shading areas according to the third embodiment of the present invention.

FIG. 9A is a flowchart for indicating the shading areas according to a third embodiment of the present invention. FIG. 9B is a schematic diagram showing the shading areas according to the third embodiment of the present invention.

FIG. 9A and FIG. 9B are used to describe how the indicating module 103 indicates the shading areas through the second indicating process in the above step S22 once the face type of the user is recognized as a square face by the positioning module 102 in the above step S16. More specific, the second indicating process is composed of the computer executable program codes recorded by the processor 10, and the indicating module 103 may perform each step shown in FIG. 9A while executing the second indicating process.

The following paragraphs are describing the second indicating process in company with FIG. 9B.

First, the indicating module 103 generates a first horizontal line 711 upon the brows 82 of the face (step S220), and obtains a first intersection point 61 of the first horizontal line 711 and the contour of the face (step S222). In particular, the first horizontal line 711 is parallel with both a left brow and a right brow of the face. The first intersection point 61 includes a left-first intersection point of the first horizontal line 711 and the left contour of the face and a right-first intersection point of the first horizontal line 711 and the right contour of the face.

Next, the indicating module 103 generates a seventh auxiliary line 97 through connecting the first intersection point 61 with the hairline 70 of the face (step S224). In particular, the indicating module 103 generates the seventh auxiliary line 97 through connecting the first intersection point 61 to an arbitrary point of the hairline 70 (for example, a point upon the hairline 70 that is perpendicular with the peak point of the eyebrow). In this embodiment, the seventh auxiliary line 97 includes a left-seventh auxiliary line generated through connecting the left-first intersection point with the hairline 70 and a right-seventh auxiliary line generated through connecting the right-first intersection point with the hairline 70.

Therefore, the indicating module 103 may constitute a forehead area A1 of the shading areas of the face based on the seventh auxiliary line 97 (step S226). More specific, the forehead area A1 in the present embodiment includes an area surrounded by the left-seventh auxiliary line and the contour of the face and another area surrounded by the right-seventh auxiliary line and the contour of the face.

Further, the indicating module 103 generates a second horizontal line 712 upon the highest points of alae of the nose 85 of the face (step S228), and obtains a second intersection point 62 of the second horizontal line 712 and the contour of the face (step S230). In particular, the second horizontal line 712 is parallel with both the highest point of the left ala of the nose and another highest point of the right ala of the nose. The second intersection point 62 includes a left-second intersection point of the second horizontal line 712 and the left contour of the face and a right-second intersection point of the second horizontal line 712 and the right contour of the face.

Next, the indicating module 103 generates a first vertical line 721 perpendicularly downward from the corner of the mouth 84 of the face (step S232). In particular, the first vertical line 721 includes a left vertical line perpendicularly generated downward from the left corner of the mouth and a right vertical line perpendicularly generated downward from the right corner of the mouth.

After the first vertical line 721 is generated, the indicating module 103 obtains a third intersection point 63 of the first vertical line 721 and the contour of the face (step S234). In particular, the third intersection point 63 includes a left-third intersection point of the left vertical line and the lower contour of the face and a right-third intersection point of the right vertical line and the contour of the face. Next, the indicating module 103 generates an eighth auxiliary line 98 through connecting the second intersection point 62 with the third intersection point 63 (step S236), wherein the eighth auxiliary line 98 includes a left-eighth auxiliary line generated through connecting the left-second intersection point with the left-third intersection point and a right-eighth auxiliary line generated through connecting the right-second intersection point with the right-third intersection point.

Therefore, the indicating module 103 may constitute a jaw area A3 of the shading areas of the face based on the eighth auxiliary line 98 (step S238). More specific, the jaw area A3 in the present embodiment includes an area surrounded by the left-eighth auxiliary line and the lower contour of the face and another area surrounded by the right-eighth auxiliary line and the lower contour of the face.

However, the indicating module 103 of the present invention does not have a fixed order for indicating the forehead area A1 and the jaw area A3. The indicating module 103 may perform indicating in an arbitrary order according to the algorithm, or may indicate multiple areas simultaneously via multiplexing, not limited thereto.

It should be mentioned that the embodiment shown in FIG. 9A and FIG. 9B is used to assist the users who having a square face to apply shading. In this embodiment, the indicating module 103 may further indicate the forehead area A1 and the jaw area A3 as dark areas, so as to suggest the user to apply dark cosmetics on these areas. In this embodiment, the analysis apparatus 1 doesn't indicate for the chin area of the face. In other words, the chin area is unnecessary to be improved for the user who has a square face.

Figure 10A:
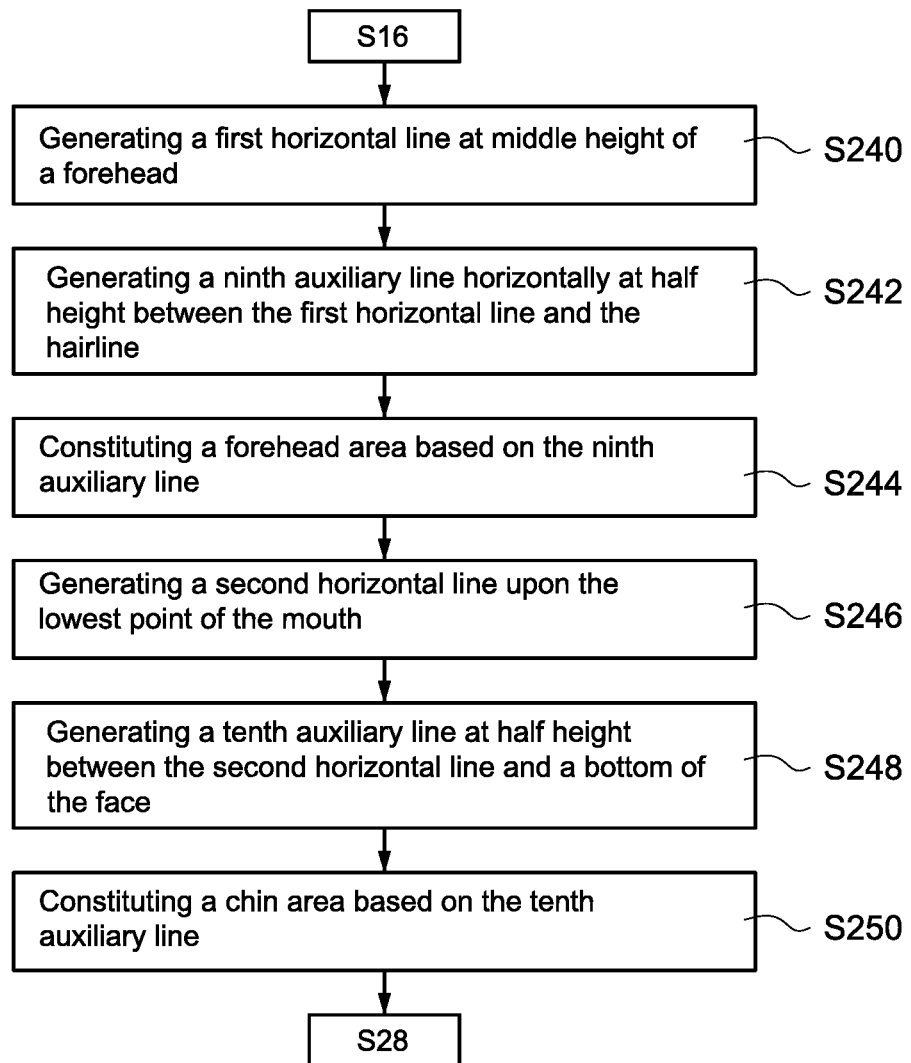
FIG. 10A is a flowchart for indicating the shading areas according to a fourth embodiment of the present invention.
Figure 10B:
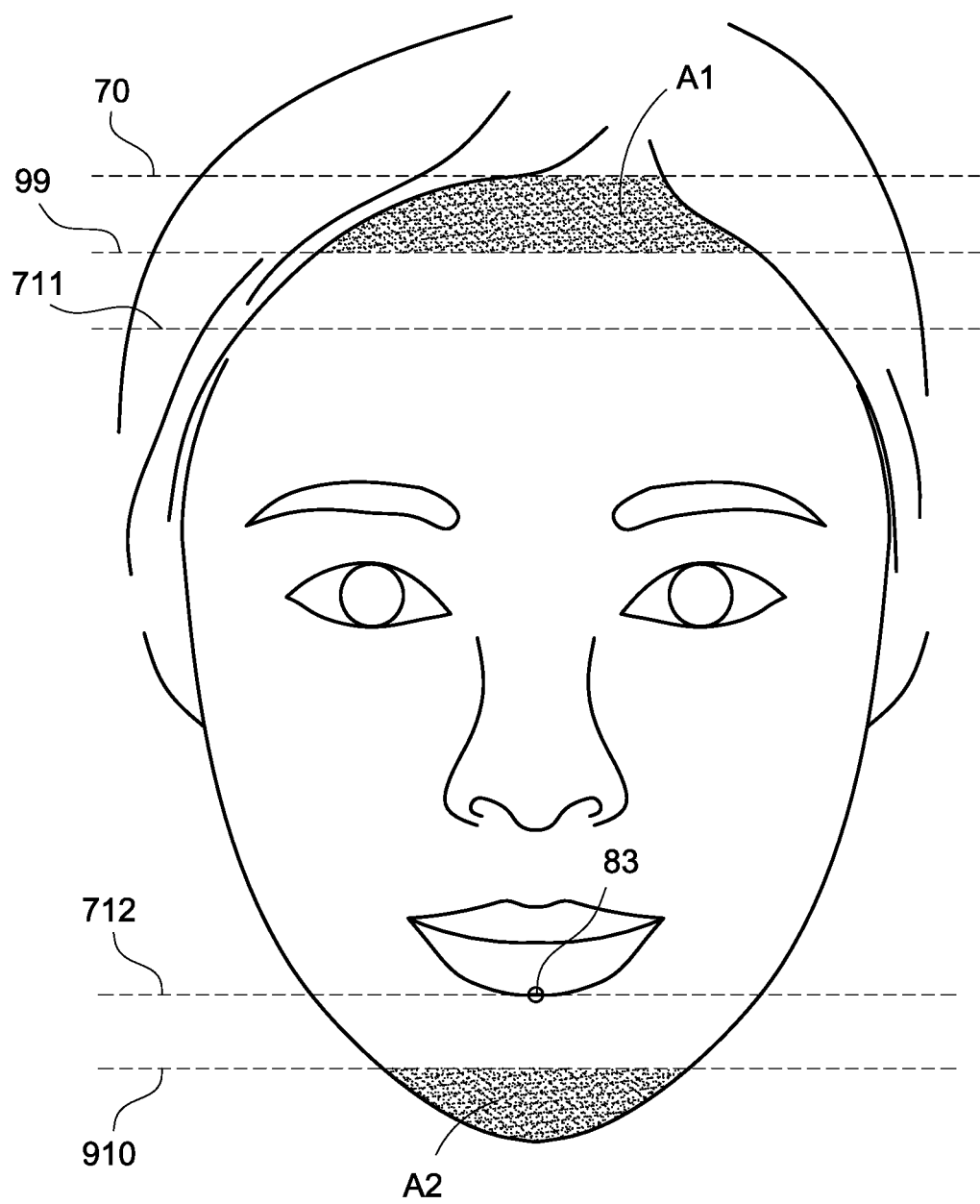
FIG. 10B is a schematic diagram showing the shading areas according to the fourth embodiment of the present invention.

FIG. 10A is a flowchart for indicating the shading areas according to a fourth embodiment of the present invention. FIG. 10B is a schematic diagram showing the shading areas according to the fourth embodiment of the present invention.

FIG. 10A and FIG. 10B are used to describe how the indicating module 103 indicates the shading areas through the third indicating process in the above step S24 once the face type of the user is recognized as a long face by the positioning module 102 in the above step S16. More specific, the third indicating process is composed of the computer executable program codes recorded by the processor 10, and the indicating module 103 may perform each step shown in FIG. 10A while executing the third indicating process.

The following paragraphs are describing the third indicating process in company with FIG. 10B.

First, the indicating module 103 generates a first horizontal line 711 at middle height of a forehead of the face (step S240), and horizontally generates a ninth auxiliary line 99 at half height between the first horizontal line 711 and the hairline 70 of the face (step S242). Therefore, the indicating module 103 may constitute a forehead area A1 of the shading areas of the face based on the ninth auxiliary line 99 (step S244). More specific, the forehead area A1 is the area surrounded by the ninth auxiliary line 99 and the upper contour of the face.

Further, the indicating module 103 generates a second horizontal line 712 upon the lowest point of the mouth 83 of the face (step S246), and horizontally generates a tenth auxiliary line 910 at half height between the second horizontal line 712 and a bottom of the face (step S248). Therefore, the indicating module 103 may constitute a chin area A2 of the shading areas based on the tenth auxiliary line 910 (step S250). More specific, the chin area A2 is the area surrounded by the tenth auxiliary line 910 and the lower contour of the face.

However, the indicating module 103 of the present invention does not have a fixed order for indicating the forehead area A1 and the chin area A2. The indicating module 103 may perform indicating in an arbitrary order according to the algorithm, or may indicate multiple areas simultaneously via multiplexing, not limited thereto.

It should be mentioned that the embodiment shown in FIG. 10A and FIG. 10B is used to assist the users who having a long face to apply shading. In this embodiment, the indicating module 103 may further indicate the forehead area A1 and the chin area A2 as dark areas, so as to suggest the user to apply dark cosmetics on these areas. In this embodiment, the analysis apparatus 1 doesn't indicate for the jaw area of the face. In other words, the jaw area is unnecessary to be improved for the user who has a long face.

Figure 11A:
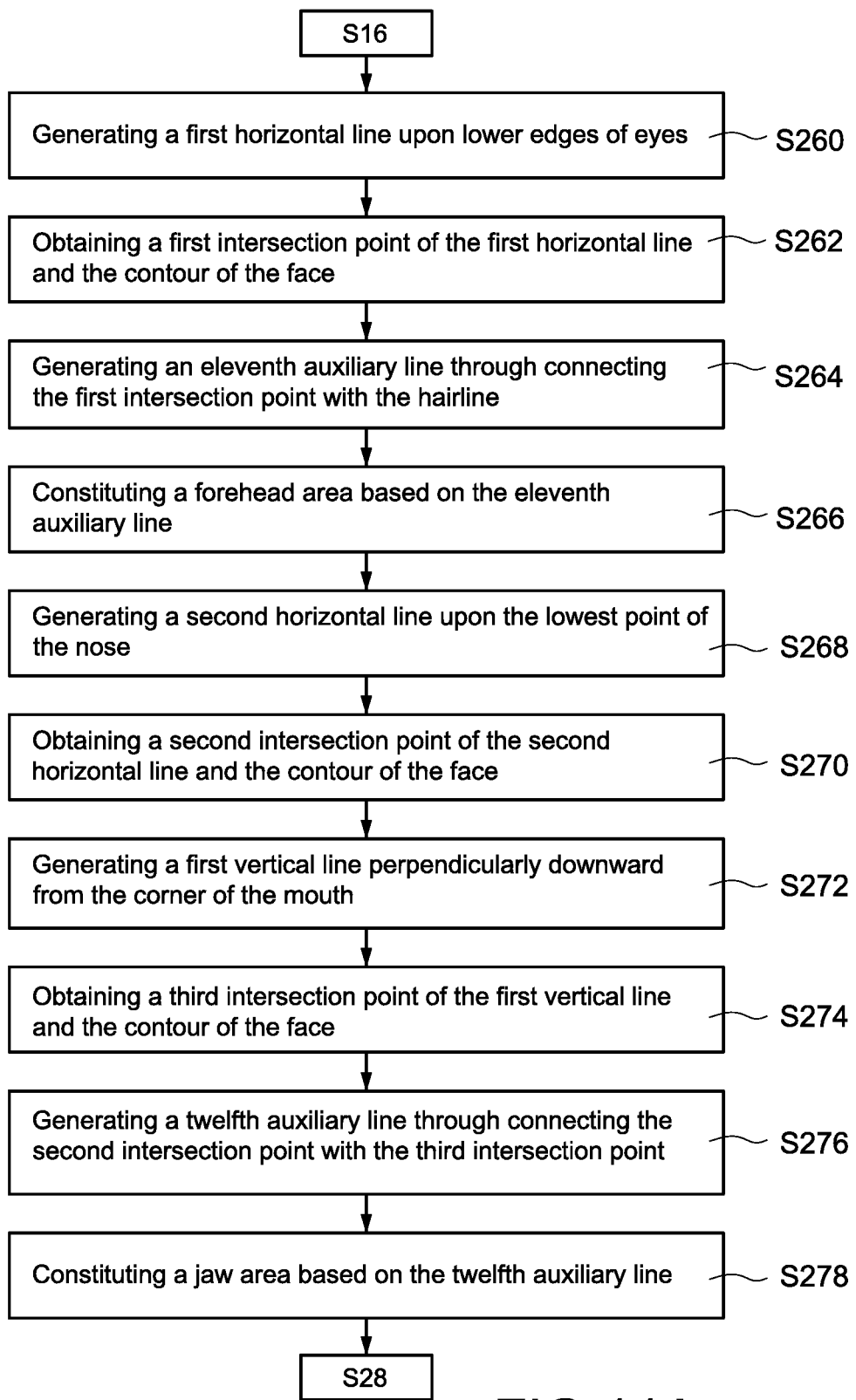
FIG. 11A is a flowchart for indicating the shading areas according to a fifth embodiment of the present invention.
Figure 11B:
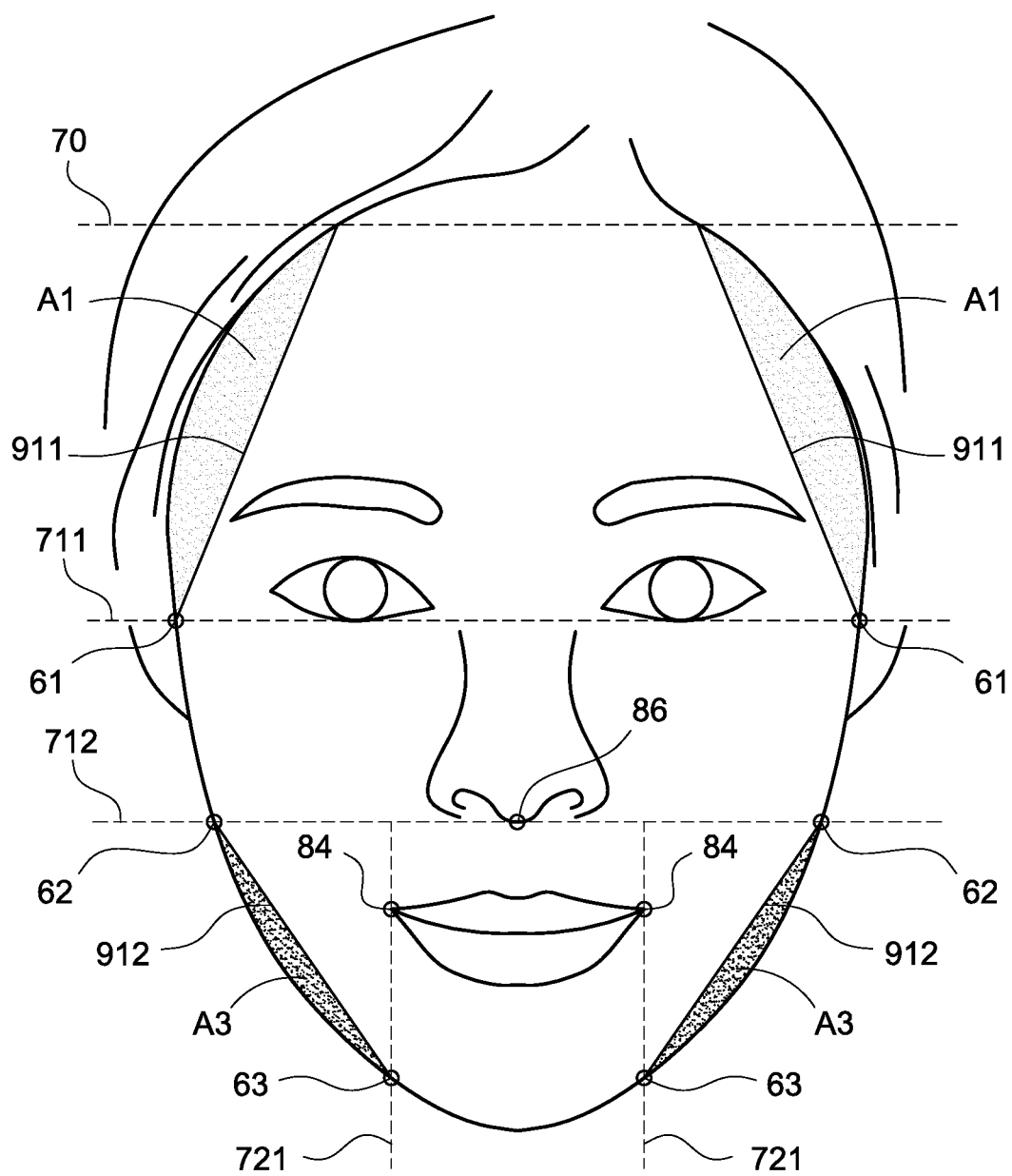
FIG. 11B is a schematic diagram showing the shading areas according to the fifth embodiment of the present invention.

FIG. 11A is a flowchart for indicating the shading areas according to a fifth embodiment of the present invention. FIG. 11B is a schematic diagram showing the shading areas according to the fifth embodiment of the present invention.

FIG. 11A and FIG. 11B are used to describe how the indicating module 103 indicates the shading areas through the fourth indicating process in the above step S26 once the face type of the user is recognized as an inverted triangular face or a diamond face by the positioning module 102 in the above step S16. More specific, the fourth indicating process is composed of the computer executable program codes recorded by the processor 10, and the indicating module 103 may perform each step shown in FIG. 11A while executing the fourth indicating process.

The following paragraphs are describing the fourth indicating process in company with FIG. 11B.

First, the indicating module 103 generates a first horizontal line 711 upon lower edges of eyes of the face (step S260), and obtains a first intersection point 61 of the first horizontal line 711 and the contour of the face (step S262). In particular, the first horizontal 711 is parallel with both the lower edge of a left eye and the lower edge of a right eye. The first intersection point 61 includes a left-first intersection point of the first horizontal line and the left contour of the face and a right-first intersection point of the first horizontal line and the right contour of the face.

Next, the indicating module 103 generates an eleventh auxiliary line 911 through connecting the first intersection point 61 with the hairline 70 of the face (step S264). In particular, the indicating module 103 generates the eleventh auxiliary line 911 through connecting the first intersection point 61 to an arbitrary point of the hairline 70 (for example, a point upon the hairline 70 that is perpendicular with the peak point of the eyebrow). In this embodiment, the eleventh auxiliary line 911 includes a left-eleventh auxiliary line generated through connecting the left-first intersection point with the hairline 70 and a right-eleventh auxiliary line generated through connecting the right-first intersection point with the hairline 70.

Therefore, the indicating module 103 may constitute a forehead area A1 of the shading areas based on the eleventh auxiliary line 911 (step S266). More specific, the forehead area A1 in the present embodiment includes an area surrounded by the left-eleventh auxiliary line and the upper contour of the face and another area surrounded by the right-eleventh auxiliary line and the upper contour of the face.

Further, the indicating module 103 generates a second horizontal line 712 upon the lowest point of the nose 86 of the face (step S268), and obtains a second intersection point 62 of the second horizontal line 712 and the contour of the face (step S270). In particular, the second intersection point 62 includes a left-second intersection point of the second horizontal line 712 and the left contour of the face and a right-second intersection point of the second horizontal line 712 and the right contour of the face.

Next, the indicating module 103 generates perpendicularly a first vertical line 721 downward from the corner of the mouth 84 of the face (step S272), and obtains a third intersection point 63 of the first vertical line 721 and the contour of the face (step S274). In particular, the first vertical line 721 includes a left vertical line generated downward from the left corner of the mouth of the face and a right vertical line generated downward from the right corner of the mouth. The third intersection point 63 includes a left-third intersection point of the left vertical line and the lower contour of the face and a right-third intersection point of the right vertical line and the lower contour of the face.

Next, the indicating module 103 generates a twelfth auxiliary line 912 through connecting the second intersection point 62 with the third intersection point 63 (step S276). In particular, the twelfth auxiliary line 912 includes a left-twelfth auxiliary line generated through connecting the left-second intersection point with the left-third intersection point and a right-twelfth auxiliary line generated through connecting the right-second intersection point with the right-third intersection point. Therefore, the indicating module 103 may constitute a jaw area A3 of the shading areas based on the twelfth auxiliary line 912 (step S278).

More specific, the jaw area A3 in the present embodiment includes an area surrounded by the left-twelfth auxiliary line and the lower contour of the face and another area surrounded by the right-twelfth auxiliary line and the lower contour of the face.

However, the indicating module 103 of the present invention does not have a fixed order for indicating the forehead area A1 and the jaw area A3. The indicating module 103 may perform indicating in an arbitrary order according to the algorithm, or may indicate multiple areas simultaneously via multiplexing, not limited thereto.

It should be mentioned that the embodiment shown in FIG. 11A and FIG. 11B is used to assist the users who having an inverted triangular face or a diamond face to apply shading. In this embodiment, the indicating module 103 may indicate the forehead area A1 as a bright area, so as to suggest the user to apply bright cosmetics on this area. Also, the indicating module 103 may further indicate the jaw area A3 as a dark area, so as to suggest the user to apply dark cosmetics on this area. In this embodiment, the analysis apparatus 1 doesn't indicate for the chin area of the face. In other words, the chin area is unnecessary to be improved for the user who has an inverted triangular face or a diamond face.

Once the above shading areas A1-A3 are indicated completely, the analysis apparatus 1 may proceed to execute the aforementioned step S28 for displaying the face image of the user in company with the indicated shading areas A1, A2, or A3 on the mirror screen 11.

FIG. 12 is a schematic diagram of the analysis apparatus according to a fourth embodiment of the present invention. As mentioned above, the analysis apparatus 1 of the present invention may capture the face image of the user 5 in real-time for recognizing and indicating the shading areas thereon based on the face type of the user 5. Also, the analysis apparatus 1 may display the face image of the user 5 and simultaneously displays the indicated shading areas right on the face image (i.e., the forehead area A1, the chin area A2, and the jaw area A3 as shown above, and FIG. 12 takes the shading areas of the round face for an example).

It should be mentioned that the processor 10 in the aforementioned embodiments uses one or more auxiliary lines 91-912 to constitute the forehead area A1, the chin area A2, and the jaw area A3. As shown in FIGS. 8C, 8D, 9B, 10B, and 11B, the constituted forehead area A1, chin area A2, and jaw area A3 are all having obvious acute angles. Before displaying, the processor 10 may perform preprocessing on these indicated forehead area A1, chin area A2, and jaw area A3 in advance. Therefore, the displayed shading areas may have smoother angles, so as to assist the user to perform proper make-up actions.

As shown in FIG. 12, the user 5 may see the reflected image of his/her own face on the mirror screen 11, and the shading areas A1-A3 are indicated and displayed on the reflected image, and the displayed shading areas A1-A3 are overlapped with the reflected image. Therefore, the user 5 may apply cosmetics based on the shading areas A1-A3 indicated and displayed on the mirror screen 11, so as to apply shading on the exact positions.

By using the analysis apparatus 1 and the indicating method of the present invention, the user 5 may see the image of his or her own face right on the mirror screen 11 and additionally be informed about the positions suitable for applying shading, so as to quickly apply cosmetics for the shading areas on the exact positions.

As the skilled person will appreciate, various changes and modifications can be made to the described embodiment. It is intended to include all such variations, modifications and equivalents which fall within the scope of the present invention, as defined in the accompanying claims.

What is claimed is:

1. A body information analysis apparatus capable of indicating shading-areas, comprising:

an image capturing module, for capturing an external image;

a processor, electrically connected with the image capturing module, recorded multiple face types and multiple indicating processes respectively corresponding to each of the face types, the processor recognizing the external image for determining whether a face is present in the external image through a face recognizing module, and performing positioning actions to each facial feature of the face and determining a face type of the face through a positioning module once the face is recognized from the external image;

wherein, the processor executes a corresponding one of the indicating processes according to the determined face type of the recognized face for indicating shading areas on the face through an indicating module once the face is determined as one of the multiple recorded face types; and a display module, electrically connected with the processor, displaying the face in company with the indicated shading areas, wherein the displayed shading areas are overlapped with the displayed face;

wherein the indicating module performs a first indicating process for indicating the shading areas on the face once the face is determined as a round face of the multiple recorded face types, and the first indicating process comprises following actions:

generating a first horizontal line upon peak points of eyebrows of the face;

generating a second horizontal line at two-thirds of height between the first horizontal line and a hairline of the face;

obtaining a first intersection point of the second horizontal line and a contour of the face;

generating a first vertical line through perpendicularly connecting the first intersection point with the first horizontal line;

obtaining a positioning point through moving the peak points of the eyebrows upward to middle height of the first vertical line;

generating a first auxiliary line through perpendicularly connecting the positioning point with the hairline;

generating a second auxiliary line through perpendicularly connecting a brow of the face with the first horizontal line;

generating a third auxiliary line through connecting the positioning point with an intersection point of the first horizontal line and the second auxiliary line;

constituting a forehead area of the shading areas based on the first auxiliary line, the second auxiliary line, and the third auxiliary line;

generating a fourth auxiliary line horizontally upon a lowest point of a mouth of the face;

generating a fifth auxiliary line perpendicularly downward from a corner of the mouth of the face;

constituting a chin area of the shading areas based on the fourth auxiliary line and the fifth auxiliary line;

generating a third horizontal line upon highest points of alae of a nose of the face;

obtaining a second intersection point of the third horizontal line and the contour of the face;

obtaining a third intersection point of the fifth auxiliary line and the lower contour of the face;

generating a sixth auxiliary line through connecting the second intersection point with the third intersection point; and constituting a jaw area of the shading areas based on the sixth auxiliary line.

2. The body information analysis apparatus in claim 1, wherein the indicating module determines that the face is unnecessary to be improved once the face is determined as an oval face of the multiple recorded face types.

3. The body information analysis apparatus in claim 1, wherein the first indicating process indicates the forehead area and the chin area as bright areas, and indicates the jaw area as a dark area.

4. The body information analysis apparatus in claim 1, wherein the indicating module performs a second indicating process for indicating the shading areas on the face once the face is determined as a square face of the multiple recorded face types.

5. The body information analysis apparatus in claim 4, wherein the indicating module performs the second indicating process for executing following actions:

generating a first horizontal line upon brows of the face;

obtaining a first intersection point of the first horizontal line and a contour of the face;

generating a seventh auxiliary line through connecting the first intersection point with a hairline of the face;

constituting a forehead area of the shading areas based on the seventh auxiliary line;

generating a second horizontal line upon highest points of alae of a nose of the face;

obtaining a second intersection point of the second horizontal line and the contour of the face;

generating a first vertical line downward from a corner of a mouth of the face;

obtaining a third intersection point of the first vertical line and the contour of the face;

generating an eighth auxiliary line through connecting the second intersection point with the third intersection point; and constituting a jaw area of the shading areas based on the eighth auxiliary line.

6. The body information analysis apparatus in claim 5, wherein the second indicating process indicates the forehead area and the jaw area as dark areas.

7. The body information analysis apparatus in claim 1, wherein the indicating module performs a third indicating process for indicating the shading areas on the face once the face is determined as a long face of the multiple recorded face types.

8. The body information analysis apparatus in claim 7, wherein the indicating module performs the third indicating process for executing following actions:

generating a first horizontal line at middle height of a forehead of the face;

generating horizontally a ninth auxiliary line at half height between the first horizontal line and a hairline of the face;

constituting a forehead area (A1) of the shading areas based on the ninth auxiliary line;

generating a second horizontal line upon a lowest point of a mouth of the face;

generating horizontally a tenth auxiliary line at half height between the second horizontal line and a bottom of the face; and constituting a chin area of the shading areas based on the tenth auxiliary line.

9. The body information analysis apparatus in claim 8, wherein the third indicating process indicates the forehead area and the chin area as dark areas.

10. The body information analysis apparatus in claim 1, wherein the indicating module performs a fourth indicating process for indicating the shading areas on the face once the face is determined as an inverted triangular face or a diamond face of the multiple recorded face types.

11. The body information analysis apparatus in claim 10, wherein the indicating module performs the fourth indicating process for executing following actions:

generating a first horizontal line upon lower points of eyes of the face;

obtaining a first intersection point of the first horizontal line and a contour of the face;

generating an eleventh auxiliary line through connecting the first intersection point with a hairline of the face;

constituting a forehead area of the shading areas based on the eleventh auxiliary line;

generating a second horizontal line upon a lowest point of a nose of the face;

obtaining a second intersection point of the second horizontal line and the contour of the face;

generating a first vertical line downward from a corner of a mouth of the face;

obtaining a third intersection pointer of the first vertical line and the contour of the face;

generating a twelfth auxiliary line through connecting the second intersection point with the third intersection point; and constituting a jaw area of the shading areas based on the twelfth auxiliary line.

12. The body information analysis apparatus in claim 11, wherein the fourth indicating process indicates the forehead area as a bright area, and indicates the jaw area as a dark area.

13. A body information analysis apparatus capable of indicating shading-areas, comprising:

an image capturing module, for capturing an external image;

a processor, electrically connected with the image capturing module, recorded multiple face types and multiple indicating processes respectively corresponding to each of the face types, the processor recognizing the external image for determining whether a face is present in the external image through a face recognizing module, and performing positioning actions to each facial feature of the face and determining a face type of the face through a positioning module once the face is recognized from the external image;

wherein, the processor executes a corresponding one of the indicating processes according to the determined face type of the recognized face for indicating shading areas on the face through an indicating module once the face is determined as one of the multiple recorded face types; and a display module, electrically connected with the processor, displaying the face in company with the indicated shading areas, wherein the displayed shading areas are overlapped with the displayed face;

wherein the indicating module performs a specific one of the indicating processes for indicating the shading areas on the face once the face is determined as a square face of the multiple recorded face types, and the specific one of the indicating processes comprises following actions:

generating a first horizontal line upon brows of the face;

obtaining a first intersection point of the first horizontal line and a contour of the face;

generating a seventh auxiliary line through connecting the first intersection point with a hairline of the face;

constituting a forehead area of the shading areas based on the seventh auxiliary line;

generating a second horizontal line upon highest points of alae of a nose of the face;

obtaining a second intersection point of the second horizontal line and the contour of the face;

generating a first vertical line downward from a corner of a mouth of the face;

obtaining a third intersection point of the first vertical line and the contour of the face;

generating an eighth auxiliary line through connecting the second intersection point with the third intersection point; and constituting a jaw area of the shading areas based on the eighth auxiliary line.

14. The body information analysis apparatus in claim 13, wherein the specific one of the indicating processes indicates the forehead area and the jaw area as dark areas.

15. A body information analysis apparatus capable of indicating shading-areas, comprising:

an image capturing module, for capturing an external image;

a processor, electrically connected with the image capturing module, recorded multiple face types and multiple indicating processes respectively corresponding to each of the face types, the processor recognizing the external image for determining whether a face is present in the external image through a face recognizing module, and performing positioning actions to each facial feature of the face and determining a face type of the face through a positioning module once the face is recognized from the external image;

wherein, the processor executes a corresponding one of the indicating processes according to the determined face type of the recognized face for indicating shading areas on the face through an indicating module once the face is determined as one of the multiple recorded face types; and a display module, electrically connected with the processor, displaying the face in company with the indicated shading areas, wherein the displayed shading areas are overlapped with the displayed face;

wherein the indicating module performs a specific one of the indicating processes for indicating the shading areas on the face once the face is determined as a long face of the multiple recorded face types, and the specific one of the indicating processes comprises following actions:

generating a first horizontal line at middle height of a forehead of the face;

generating horizontally a ninth auxiliary line at half height between the first horizontal line and a hairline of the face;

constituting a forehead area of the shading areas based on the ninth auxiliary line;

generating a second horizontal line upon a lowest point of a mouth of the face;

generating horizontally a tenth auxiliary line at half height between the second horizontal line and a bottom of the face; and constituting a chin area of the shading areas based on the tenth auxiliary line.

16. The body information analysis apparatus in claim 15, wherein the specific one of the indicating processes indicates the forehead area and the chin area as dark areas.

* * * * *